(12) United States Patent
Kuroki et al.

(10) Patent No.: US 8,690,186 B2
(45) Date of Patent: Apr. 8, 2014

(54) AIRBAG SYSTEM OF SADDLE-RIDE TYPE VEHICLE

(75) Inventors: Kazuyoshi Kuroki, Wako (JP); Satoshi Iijima, Wako (JP); Kazuhiro Suzuki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 75 days.

(21) Appl. No.: 12/877,213

(22) Filed: Sep. 8, 2010

(65) Prior Publication Data
US 2011/0074138 A1 Mar. 31, 2011

(30) Foreign Application Priority Data

Sep. 30, 2009 (JP) ................................ 2009-226625

(51) Int. Cl.
*B60R 21/231* (2011.01)
*B60R 21/2338* (2011.01)

(52) U.S. Cl.
USPC .................. 280/730.1; 280/728.2; 280/743.2

(58) Field of Classification Search
USPC ....................... 280/728.1, 728.2, 730.1, 743.2
See application file for complete search history.

(56) References Cited

U.S. PATENT DOCUMENTS

| | | | |
|---|---|---|---|
| 3,930,667 A * | 1/1976 | Osuchowski et al. | 280/730.1 |
| 6,846,009 B2 * | 1/2005 | Kuroe et al. | 280/730.1 |
| 6,932,379 B2 * | 8/2005 | Yamazaki et al. | 280/730.1 |
| 6,971,666 B2 * | 12/2005 | Akiyama et al. | 280/729 |
| 7,044,499 B2 * | 5/2006 | Miyata et al. | 280/730.1 |
| 7,264,270 B2 * | 9/2007 | Miyata et al. | 280/743.2 |
| 7,275,762 B2 * | 10/2007 | Miyata | 280/743.2 |
| 7,331,600 B2 * | 2/2008 | Miyata | 280/730.1 |
| 7,404,570 B2 * | 7/2008 | Miyata | 280/728.2 |
| 7,566,070 B2 * | 7/2009 | Miyata | 280/730.1 |
| 7,641,225 B2 * | 1/2010 | Kuroe et al. | 280/730.1 |
| 7,793,976 B2 * | 9/2010 | Kuroe | 280/743.2 |
| 2003/0214121 A1 * | 11/2003 | Miyata et al. | 280/730.1 |
| 2004/0051281 A1 * | 3/2004 | Miyata | 280/730.1 |
| 2004/0150197 A1 * | 8/2004 | Iijima et al. | 280/730.1 |
| 2005/0236817 A1 * | 10/2005 | Sonoda et al. | 280/730.1 |
| 2007/0052214 A1 * | 3/2007 | Miyata | 280/730.1 |
| 2007/0085306 A1 * | 4/2007 | Miyata | 280/728.2 |
| 2007/0170703 A1 * | 7/2007 | Miyata | 280/730.1 |
| 2007/0170704 A1 * | 7/2007 | Miyata | 280/730.1 |
| 2007/0187931 A1 * | 8/2007 | Horiuchi et al. | 280/730.1 |

(Continued)

FOREIGN PATENT DOCUMENTS

| | | | |
|---|---|---|---|
| DE | 10 2008 003 766 A1 | 9/2008 |
| EP | 1 362 777 A2 | 11/2003 |

(Continued)

*Primary Examiner* — Faye M Fleming
*Assistant Examiner* — Barry Gooden Jr
(74) *Attorney, Agent, or Firm* — Squire Sanders (US) LLP

(57) ABSTRACT

An airbag system is configured to fulfill its role on a saddle-ride type vehicle even when the vehicle collides with a side of a vehicle moving in a generally perpendicular direction. An embodiment of the airbag system includes an airbag which is configured to the inflated and fully upward from the vehicle front of a rider. The airbag includes a head part opposite to a rider's head during inflation and deployment, and a neck part which rises upward from the vehicle and toward the head part. The neck part has a width in a direction of vehicle width which is narrower than that of the head part. The neck part includes neckings curved inward in the direction of the vehicle width.

10 Claims, 20 Drawing Sheets

(56) References Cited

U.S. PATENT DOCUMENTS

| | | | |
|---|---|---|---|
| 2007/0284857 A1* | 12/2007 | Miyata | 280/728.2 |
| 2008/0111350 A1* | 5/2008 | Yatagai et al. | 280/728.1 |
| 2008/0224456 A1* | 9/2008 | Kuroe et al. | 280/730.1 |
| 2008/0231024 A1* | 9/2008 | Yatagai et al. | 280/728.1 |
| 2009/0167002 A1* | 7/2009 | Suzuki et al. | 280/728.2 |
| 2009/0206628 A1* | 8/2009 | Misaki et al. | 296/78.1 |

FOREIGN PATENT DOCUMENTS

| | | |
|---|---|---|
| JP | 2002-137779 A | 5/2002 |
| JP | 2002-137780 A | 5/2002 |
| JP | 2007-001406 A | 1/2007 |
| JP | 2007-069785 | 3/2007 |
| JP | 2008-222163 A | 9/2008 |
| JP | 2009-160983 A | 7/2009 |

\* cited by examiner

Fig. 6
(a)
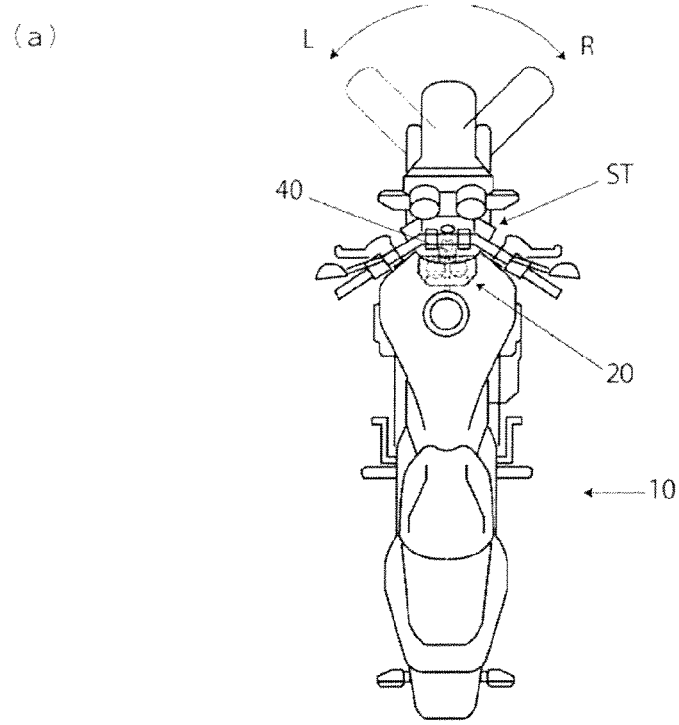
(b)
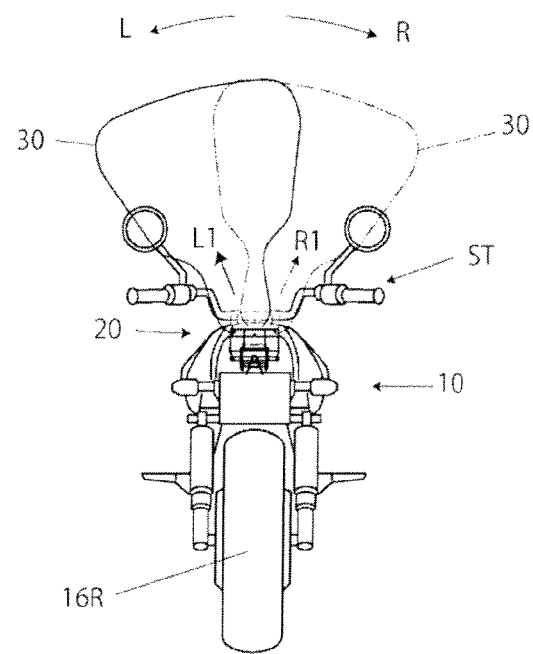

Fig. 13
(a)
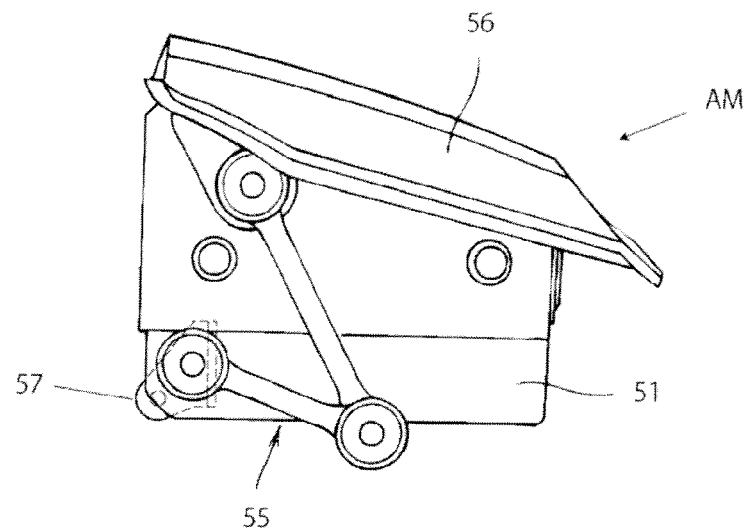
(b)
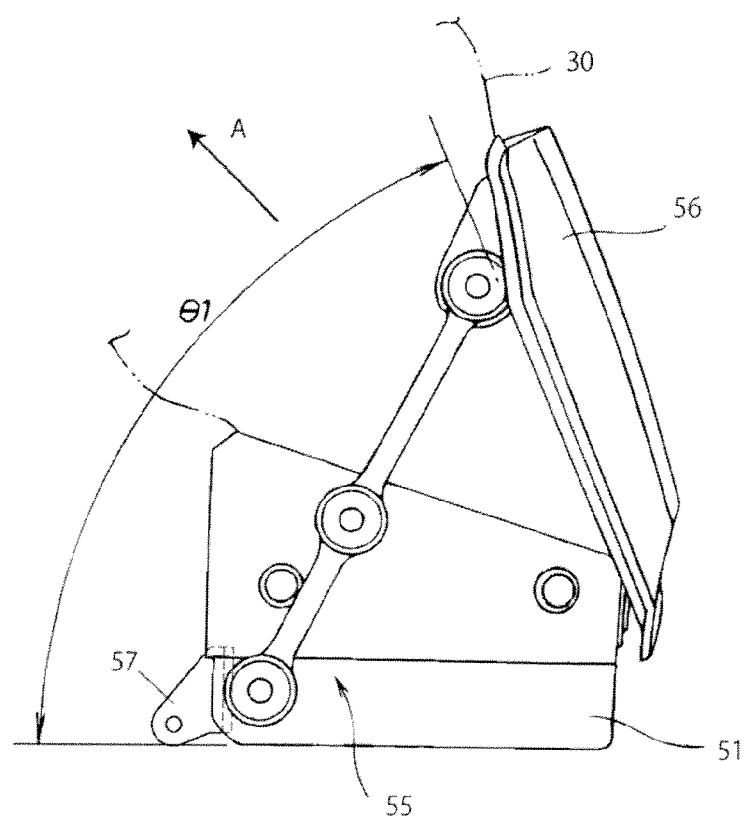

Fig. 15
(a)
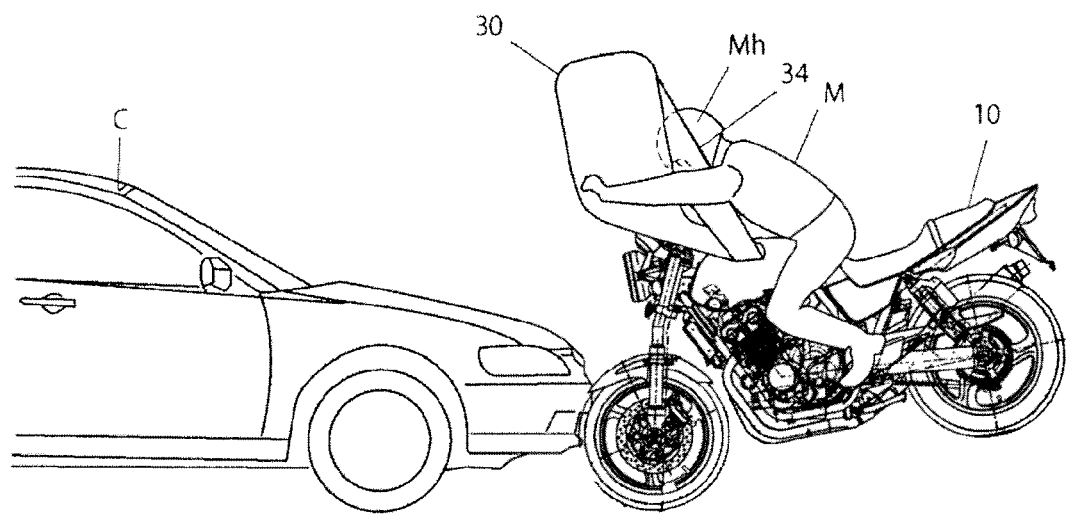
(b)
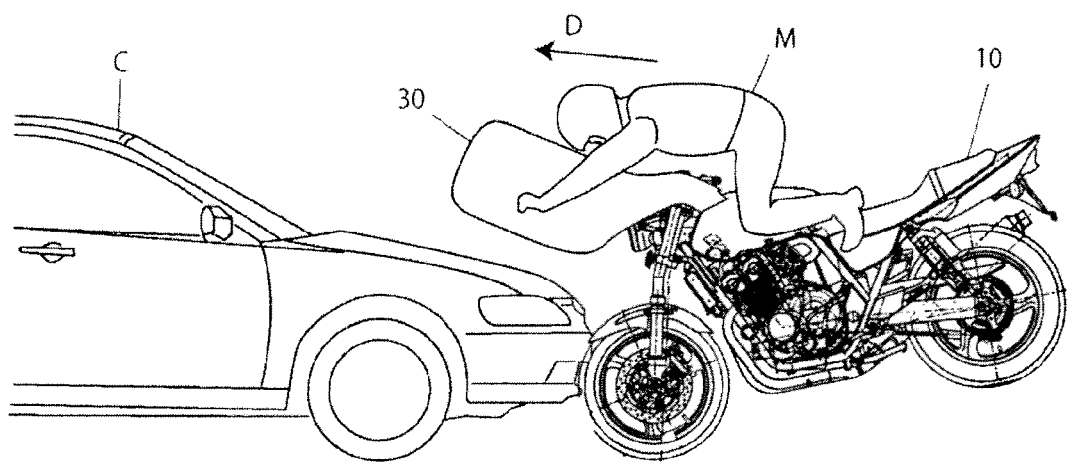

Fig. 20
(a)
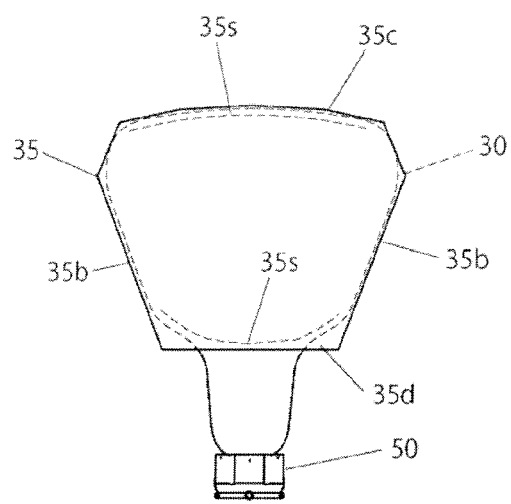
(b)
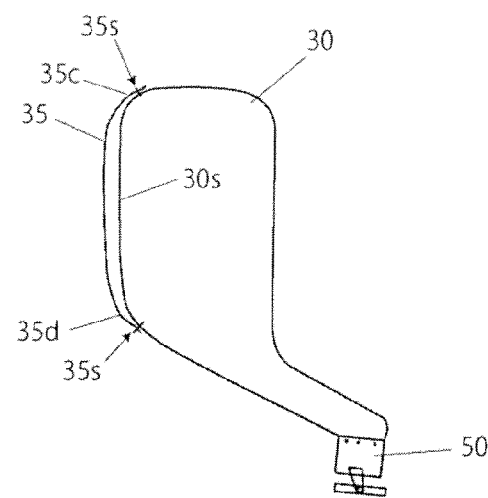
(c)
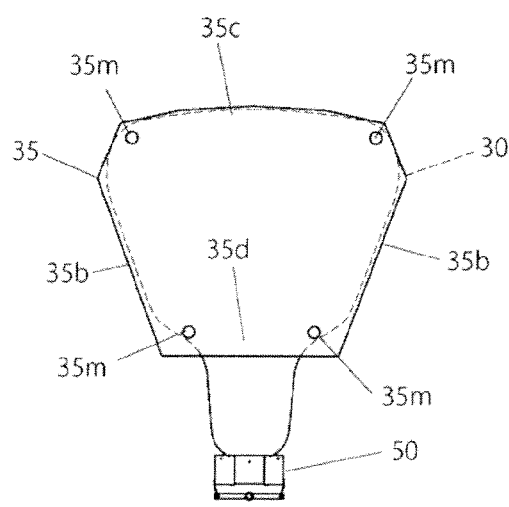
(d)
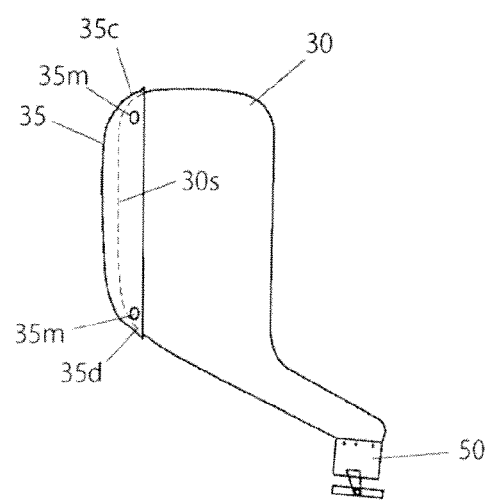

AIRBAG SYSTEM OF SADDLE-RIDE TYPE VEHICLE

BACKGROUND

1. Field

This invention relates to an airbag system of a saddle-ride type vehicle.

2. Description of the Related Art

An airbag system of a saddle-ride type vehicle such as a motorcycle provided with an airbag, inflated and deployed between a wind screen of the vehicle and a rider is disclosed, for example, in Japanese Patent Publication No. JP-A No. 2007-069785.

When a saddle-ride type vehicle collides with the side of a running vehicle such as a four-wheeled vehicle which is one embodiment of an object of collision (hereinafter called a vehicle of the other party), yawing is caused in the saddle-ride type vehicle, and the saddle-ride type vehicle is laterally moved together with the vehicle of the other party. In the meantime, n rider of the saddle-ride type vehicle collides with the side of the vehicle of the other party in a traveling direction before the collision without being laterally moved according to a law of inertia. That is, when the saddle-ride type vehicle collides with the side of the running vehicle of the other party, a traveling direction (a moving direction) immediately after the collision of the saddle-ride type vehicle and the moving direction of the rider are different.

As the above-mentioned existing type airbag system of the saddle-ride type vehicle is an in-one's own vehicle supporting airbag deployed between the rider and the wind screen of the vehicle to relieve shock, the airbag system is hardly influenced by yawing. That is, as the airbag according to the related art is deployed between the rider and the wind screen of the vehicle and acts on the rider at early timing at which yawing is small, the airbag can absorb the kinetic energy of the rider without being influenced so much by the yawing. However, to apply the in-one's own vehicle supporting airbag, vehicular conditions such as large space in front of a rider are required.

In the meantime, if an airbag which is deployed between a vehicle of the other party and a rider and fulfills buffer action is used without adopting the in-one's own vehicle supporting airbag, the above-mentioned vehicular conditions can be relieved (for example, a wind screen is not required to be provided).

However, as the timing of the action on the rider of the airbag deployed between the vehicle of the other party and the rider is slower, compared with the in-one's own vehicle supporting airbag, consideration of the yawing is required.

SUMMARY

Accordingly, an object of the present invention is to provide an airbag system of a saddle-ride type vehicle that can fulfill its role even if the saddle-ride type vehicle collides with the side of a running vehicle of the other party and yawing is caused.

To achieve the object, an airbag system of the saddle-ride type vehicle according to an embodiment of the present invention is based upon an airbag system of a saddle-ride type vehicle including an airbag which is configured to be inflated and deployed upward from the vehicle in front of a rider. The airbag is provided with a head part opposite to a rider's head in inflating and deploying, and a neck part which rises upward from the vehicle and toward the head part. The neck part has a width in a direction of vehicle width which is narrower than that of the head part, and includes neckings curved inward in the direction of vehicle width.

BRIEF DESCRIPTION OF DRAWINGS

FIGS. 6(a)-6(b) illustrate the operation of an interlocking device, FIG. 6(a) is a plan, and FIG. 6(b) shows the vehicle shown in FIG. 6(a) which is viewed from the back.

FIG. 10(a) is a plan, FIG. 10(b) is a side view of FIG. 10(a), and FIG. 10(c) is a front view of FIG. 10(a) (viewed from the back of the vehicle).

FIG. 13(a) is a side view showing the airbag module and FIG. 13(b) is a side view showing a state in which a lid is open.

FIG. 14(a) is a side view, and FIG. 14(b) shows the vehicle viewed from the back.

FIG. 15(a) is an explanatory drawing for explaining action and FIG. 15(b) shows a comparative embodiment.

FIG. 20(a) is a front view showing an embodiment in which a protective sheet 35 is mounted, FIG. 20(b) is a side sectional view of FIG. 20(a), FIG. 20(c) is a front view showing another embodiment in which the protective sheet 35 is mounted, and FIG. 20(d) is a side view of FIG. 20(c).

DETAILED DESCRIPTION

Figure 1:
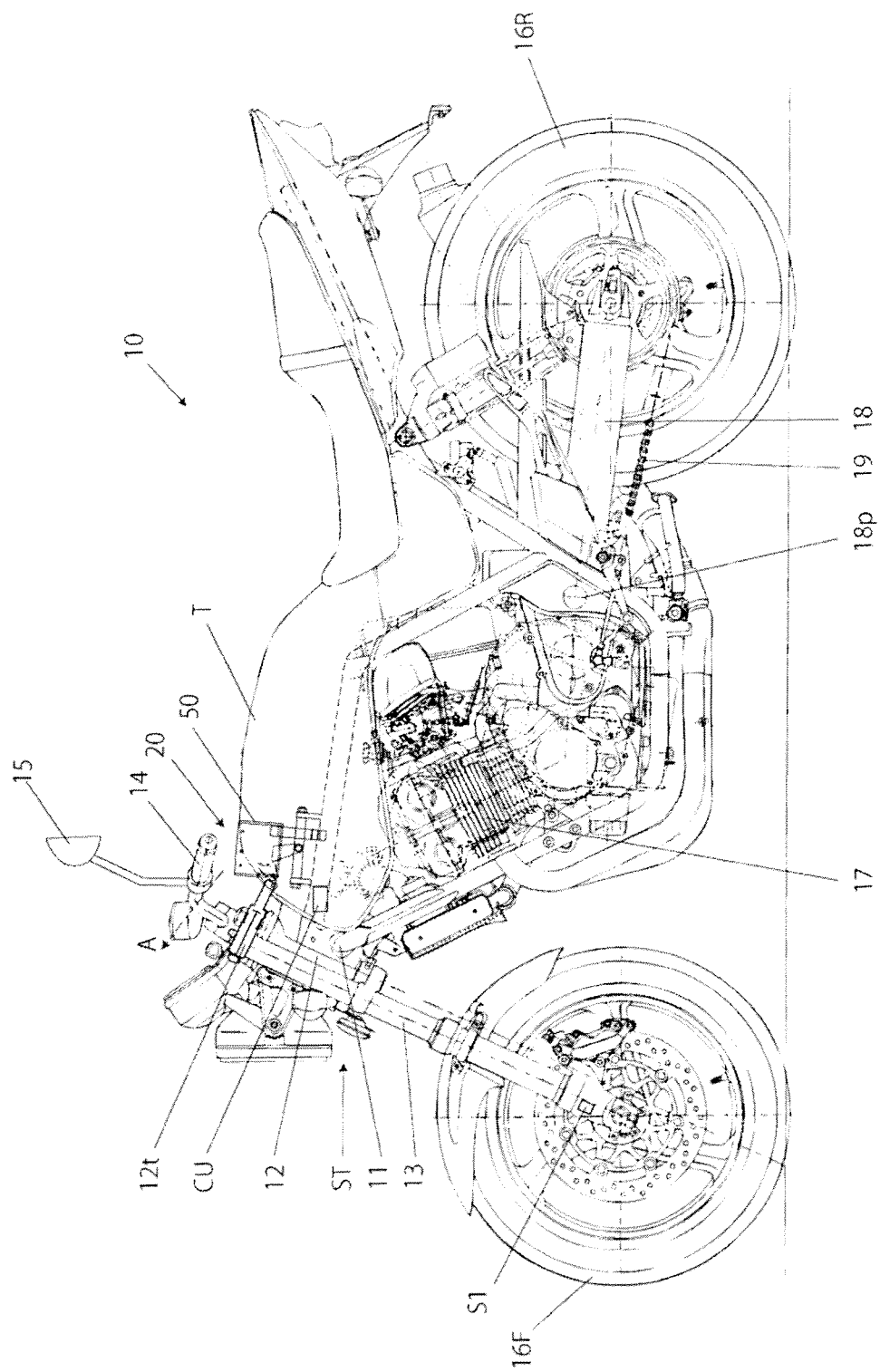
FIG. 1 is a partially perspective side view showing one embodiment of a saddle-ride type vehicle using one embodiment of an airbag system of the saddle-ride type vehicle according to the present invention.

According to the airbag system of the saddle-ride type vehicle, the following action and effect are acquired.

As described above, when the saddle-ride type vehicle collides with the side of a running vehicle of the other party, the saddle-ride type vehicle is often turned a state in which it is turned in a traveling direction of the vehicle of the other party (a state in which yawing is caused and a so-called state in which the saddle-ride type vehicle is taken by the vehicle of the other party). In the meantime, as described above, the rider of the saddle-ride type vehicle can collide with the side of the vehicle of the other party in a traveling direction before the collision, according to a law of inertia.

According to an embodiment of the invention, as the airbag is provided with a head part actually being disposed opposite to the rider's head in during inflation and deployment, and the neck part which rises upward from the vehicle and toward the part opposite to the head, the width in the direction of vehicle width of which is narrower than that of the part opposite to the head and which has neckings curved inside in the direction of vehicle width, the neck part and the part opposite to the head are inflated and deployed with the neck part having the neckings avoiding so-called interference from the vehicle. Therefore, even if the saddle-ride type vehicle collides with the side of the running vehicle of the other party and is turned by the force of a collision in the traveling direction of the vehicle of the other party, the airbag is inflated and deployed in the substantially same direction as the traveling direction before the collision and the state is easily maintained. That is, the airbag is inflated and deployed immediately after collision. Ordinarily, the saddle-ride type vehicle is turned in the same direction as the vehicle of the other party immediately after it, and the rider comes to collide with the side of the vehicle of the other party in the traveling direction before the collision. However, with embodiments of the invention, the neck part having the neckings can avoid interference from the vehicle by the quantity of the neckings and as a result, the airbag is not moved together with the vehicle.

Therefore, a position of the head part in the inflated and deployed airbag is easily matched with a moving direction of the rider, based upon the law of inertia.

Accordingly, even if the saddle-ride type vehicle collides with the side of the running vehicle of the other party, embodiments of the invention enable the airbag to fulfill its role.

It is desirable that the part opposite to the head is located on the upside of a handlebar provided to the vehicle in inflating and deploying.

As a result, as the airbag can more securely avoid interference from the vehicle, particularly from the handlebar and is not significantly moved together with the vehicle, the position of the part opposite to the head is easily matched with the moving direction of the rider.

It is desirable that an upper part of the part opposite to the head is wider in the direction of vehicle width than a lower part in inflating and deploying.

As a result, as the airbag can more securely avoid interference from the vehicle and is not significantly moved together with the vehicle, the position of the part opposite to the head is easily matched with the moving direction of the rider. The airbag can be compacted by making the lower part of the part opposite to the head narrower than the upper part and at the same time, a rider protecting function can be enhanced by relatively making the upper part of the part opposite to the head wider.

It is desirable that the part opposite to the head is located in front of the handlebar provided to the vehicle in inflating and deploying.

As a result, as the airbag can more securely avoid interference from the vehicle, particularly from the handlebar and is not significantly moved together with the vehicle, the position of the part opposite to the head being easily matched with the moving direction of the rider.

It is desirable that a pair of right and left mooring bodies that couple the part opposite to the head and the vehicle separately from the neck part and moor the part opposite to the head in inflating and deploying are provided.

As a result, even if no body (for example, the vehicle of the other party) that supports the airbag exists immediately in front of the inflated and deployed airbag, the airbag receives the rider and can absorb a part of rider's kinetic energy.

It is desirable that the mooring bodies are coupled to an airbag module mounted in the vehicle in a state in which the airbag and an inflator that inflates and deploys the airbag are integrally housed on both sides of the vehicle.

As a result, a degree of freedom in the design of the other body parts is enhanced, compared with a case that the mooring bodies are coupled to the vehicle body.

It is desirable that the pair of right and left mooring bodies is coupled both right and left ends in the direction of vehicle width of the part opposite to the head on the side of the airbag.

As a result, even if no body (for example, the vehicle of the other party) that supports the airbag exists in front of the inflated and deployed airbag, the airbag receives the rider and can absorb a part of rider's kinetic energy.

Referring to the drawings, embodiments of an airbag system of a saddle-ride type vehicle according to this invention will be described below.

Figure 2:
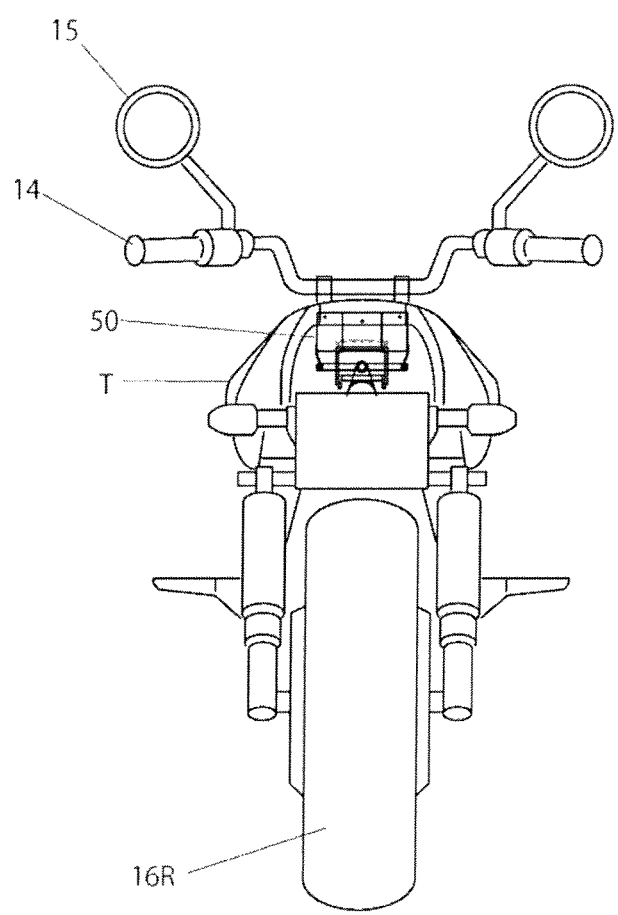
FIG. 2 is a partially perspective schematic diagram showing the vehicle viewed from the back.

FIG. 1 is a side view showing an embodiment of a saddle-ride type vehicle using an embodiment of the airbag system of the saddle-ride type vehicle according to the present invention; FIG. 2 shows the vehicle viewed from the back.

The vehicle 10 shown in FIGS. 1 and 2 is a motorcycle; it should be noted that other vehicles can also be used. Motorcycle 10 is provided with a frame or body frame 11 configuring its body. A pair of right and left front forks 13 is steerably attached to a head pipe 12 configuring a front end of the body frame 11 and a handlebar 14 is attached to each upside of the front forks 13. A back or rearview mirror 15 can be attached to the handlebar 14. A front wheel 16F can be rotatably attached to a lower end of the front fork 13, And an engine 17 can be fixed to the body frame 11. In this example, swing arm 18 is vertically swingably attached to the rear of the body frame 11 via a pivot 18p, and a rear wheel 16R which is a driving wheel is rotatably attached to a rear end of the swing arm 18. The rear wheel 16R is driven via a chain 19, or other torque-transferring mechanism, provided between the rear wheel and the engine 17.

Figure 3:
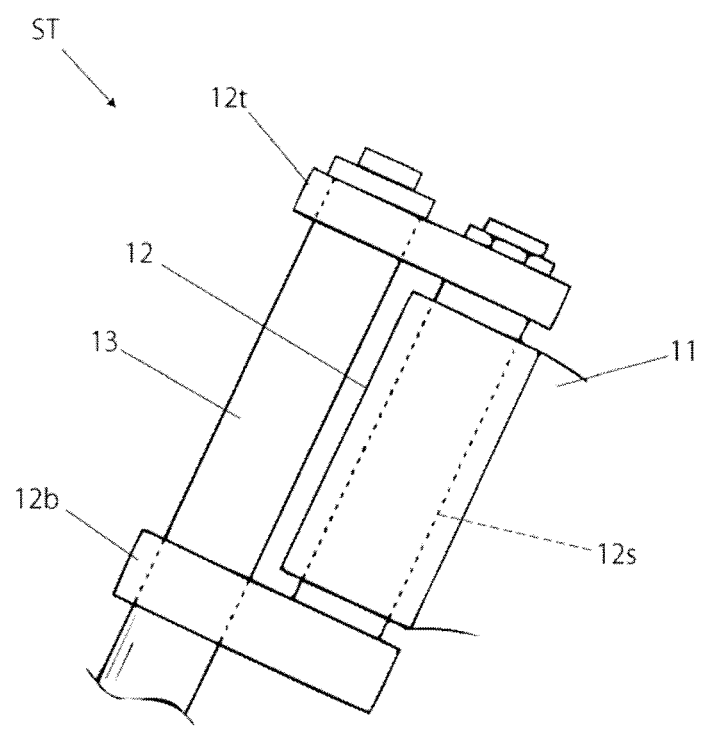
FIG. 3 is a side view showing a steering unit.

A steering unit ST in the motorcycle 10 can be configured using well-known basic structure. The steering unit ST can be configured by turnably supporting a stem shaft 12s by the head pipe 12, as shown in FIG. 3 for example, connecting a top bridge 12t and a bottom bridge 12b to an upper part and a lower part of the stem shaft 12s, supporting the pair of front forks 13 with the top bridge 12t and the bottom bridge 12b, rotatably attaching the front wheel 16F to the lower ends of the front forks 13 and fixing the handlebar 14 (see FIG. 1) to the top bridge 12t.

The above-mentioned steering unit ST can change a course of the motorcycle 10 clockwise or counterclockwise in a top view when the rider turns the handlebar 14 (see FIG. 1).

Figure 4:
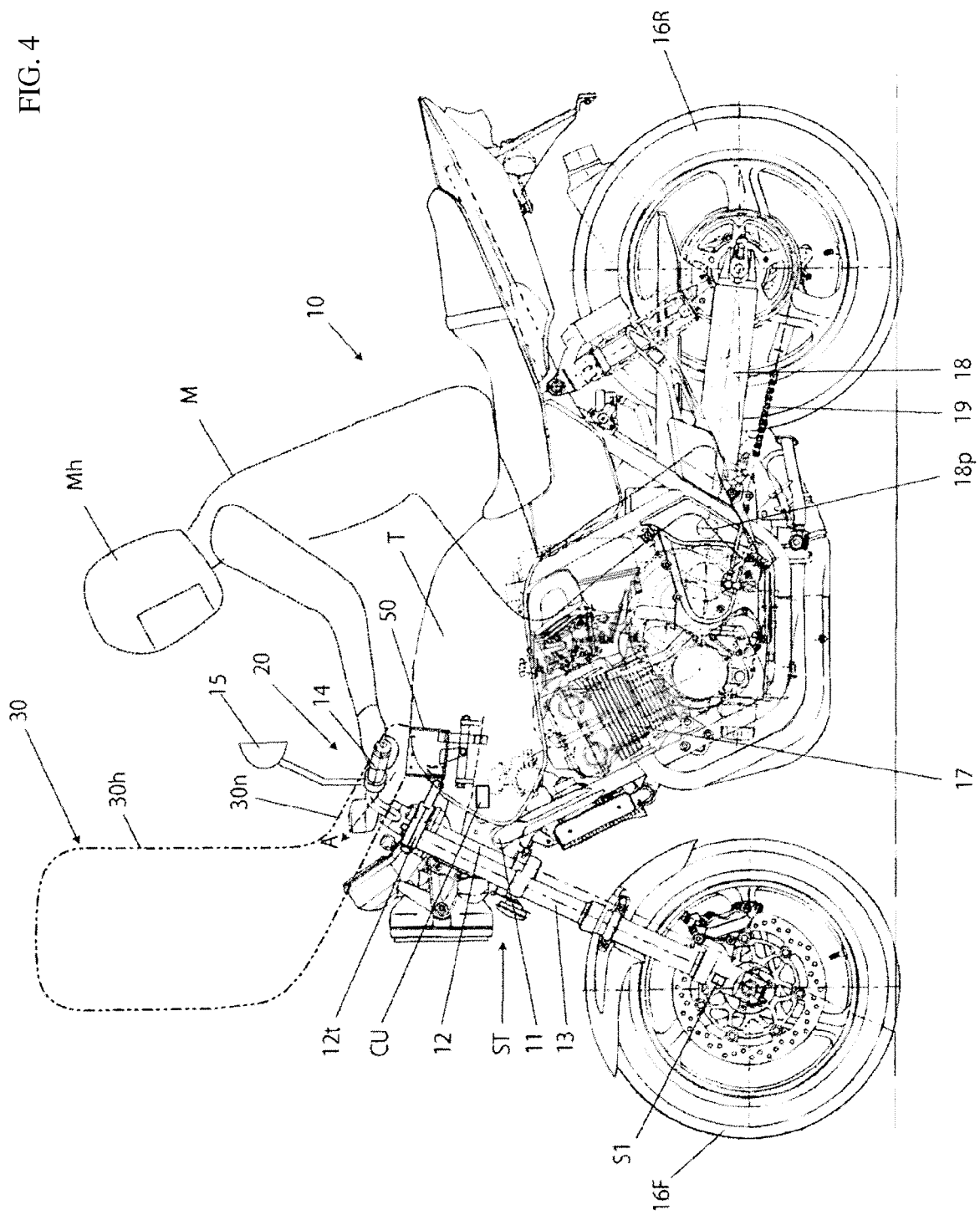
FIG. 4 is a partially perspective side view showing a state of the motorcycle an airbag of which is inflated and deployed.
Figure 5:
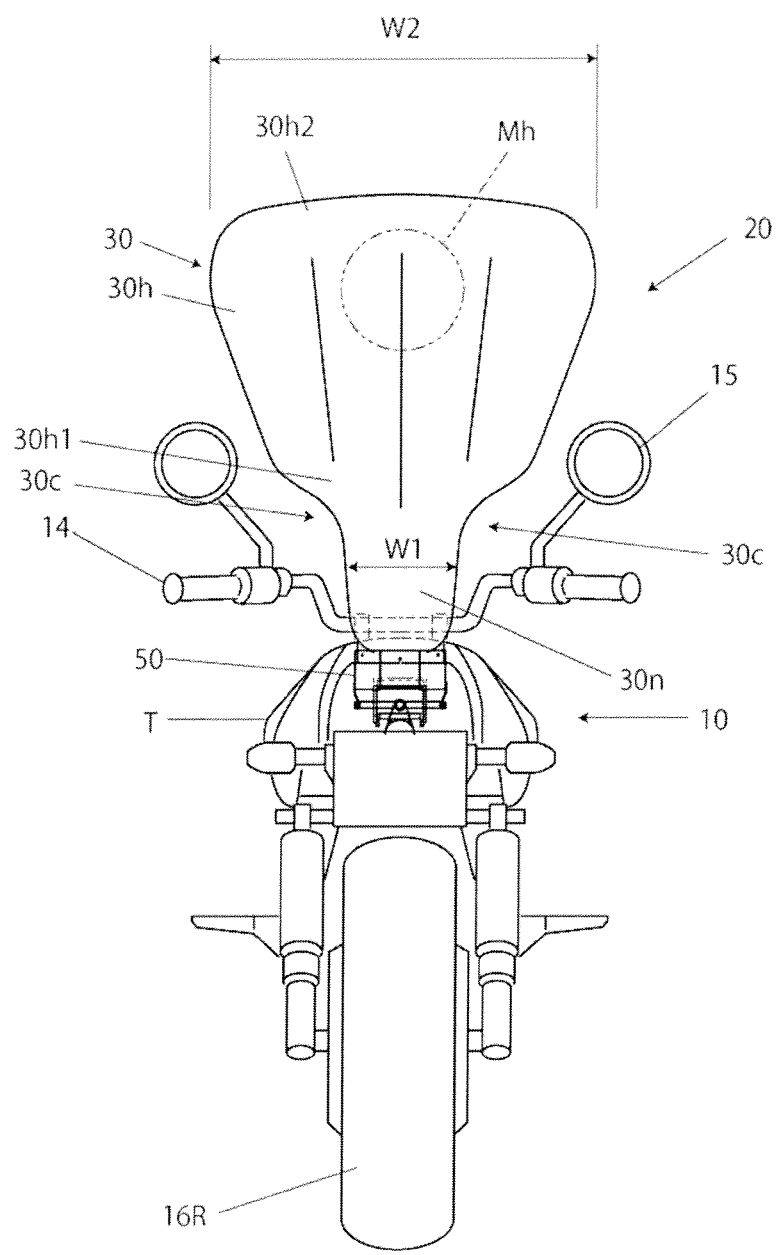
FIG. 5 is a partially perspective schematic diagram showing the vehicle viewed from the back.

FIG. 4 is a side view showing a state of the motorcycle 10 when an airbag is inflated and deployed. FIG. 5 shows the same state of the motorcycle, viewed from the back.

As shown in FIGS. 4 and 5, the airbag system 20 can be mounted in the front of a fuel tank T in the motorcycle 10.

Figure 7:
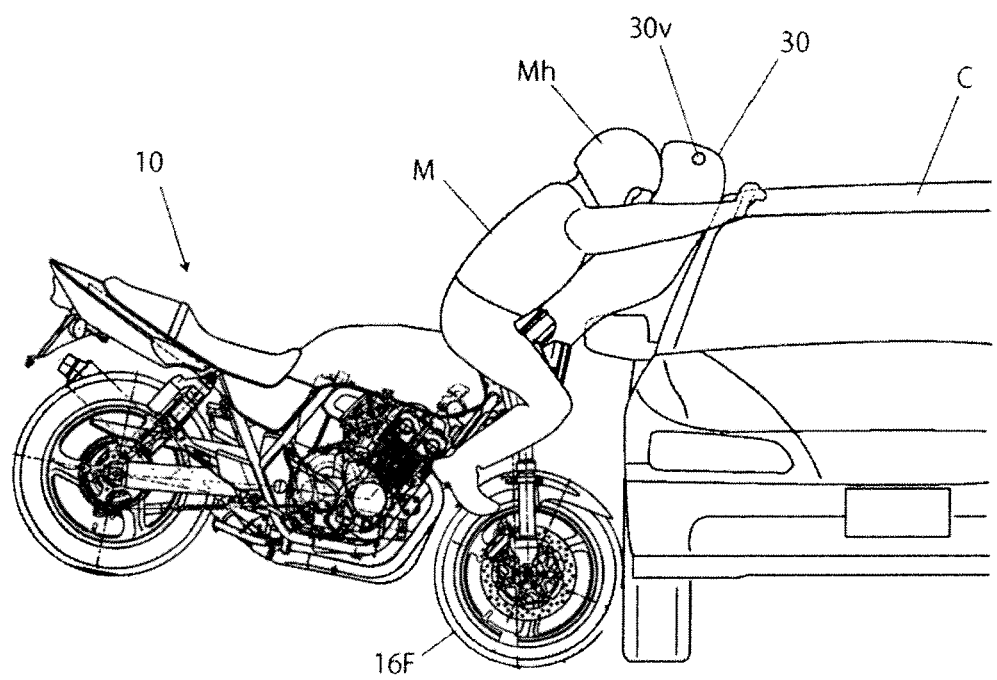
FIG. 7 is a side view showing a state of collision.

The airbag system 20 is illustrated with the airbag 30 inflated and deployed upward from the vehicle 10 in front of the rider M in collision with a vehicle of the other party C, as shown in FIG. 7.

As shown in FIGS. 4 and 5, the airbag 30 is provided with a head part 30h which is opposite to the head Mh of the rider M when the airbag is inflated and deployed and a neck part 30n which rises upward from the vehicle 10 and toward the part opposite to the head 30h. The width W1 in a direction of vehicle width of which is narrower than the width W2 of the part opposite to the head 30h and which has neckings 30c curved inside in the direction of vehicle width.

When the airbag is configured as described above, the following action and effect can result.

Figure 8:
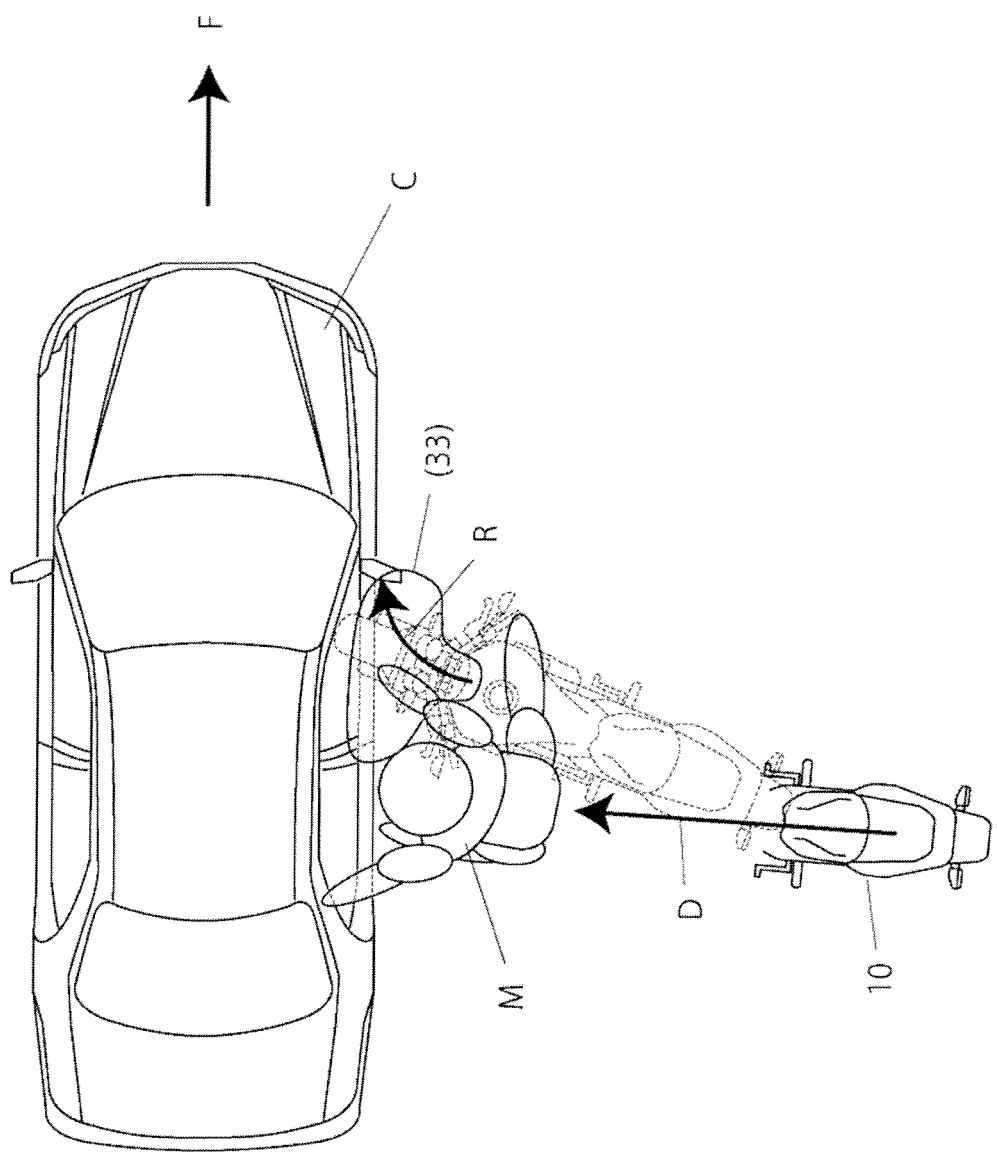
FIG. 8 is a plan showing a state of collision which tells a problem of the related art.

When the saddle-ride type vehicle 10 collides with the side of the running vehicle of the other party C as shown in FIG. 7, the saddle-ride type vehicle 10 is ordinarily turned in a traveling direction F of the vehicle of the other party C (a state in which yawing is caused and a so-called state in which the vehicle is taken by the vehicle of the other party C) due to the collision with the vehicle of the other party C as shown in FIG. 8. That is, the saddle-ride type vehicle 10 is moved laterally (in a direction shown by an arrow R in a case shown in FIG. 8) in the traveling direction of the vehicle of the other party C due to the collision with the vehicle of the other party C when a traveling direction of the saddle-ride type vehicle before the collision is D.

As described above, the rider M of the saddle-ride type vehicle 10 collides with the side of the vehicle of the other party C in the traveling direction D, which is the traveling direction before the collision (without being moved laterally), according to a law of inertia.

As the above-mentioned existing airbag system of the saddle-ride type vehicle is an in-one's own vehicle supporting airbag which relieves shock by deploying the airbag between the rider and the wind screen of the vehicle, the airbag system is hardly influenced by the yawing. That is, as the airbag according to the related art is deployed between the rider and the wind screen of the vehicle and acts on the rider at early timing at which yawing is small, the airbag can absorb the kinetic energy of the rider without being significantly influenced by the yawing. However, to apply the in-one's own vehicle supporting airbag, vehicular conditions such as large space in front of the rider are required.

In the meantime, if an airbag 30 which is deployed between a vehicle of the other party C and an rider M and fulfills buffer action is used as in this embodiment for example, the above-mentioned vehicular conditions can be relieved (for example, no wind screen is required to be provided).

However, as the timing of the action on the rider M of the airbag 30 deployed between the vehicle of the other party C and the rider M is slower, compared with the in-one's own vehicle supporting airbag, consideration of the yawing is required.

Figure 9:
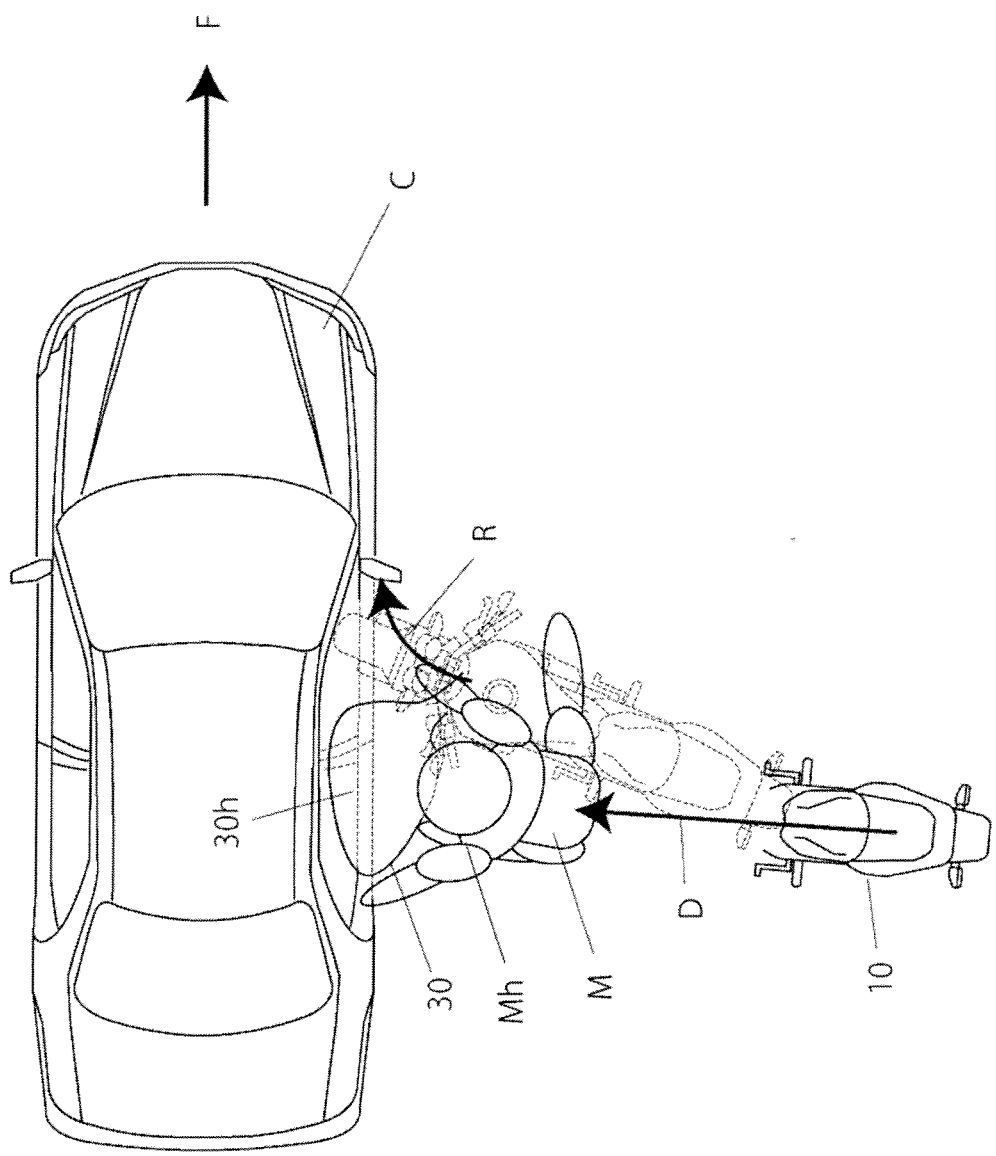
FIG. 9 is a plan showing a state of collision which illustrates action by the embodiment.

According to the airbag system 20 in this embodiment, as shown in FIG. 5, as the airbag 30 is provided with the head part 30h which is opposite to the head Mh of the rider M when the airbag is inflated and deployed and the neck part 30n which rises upward from the vehicle 10 and toward the part opposite to the head 30h, the width W1 in the direction of vehicle width, which is narrower than the width of the head part 30h, and which has the neckings 30c curved inside in the direction of vehicle width, the neck part 30n and the part opposite to the head 30h are inflated and deployed with the neck part 30n having the neckings 30c avoiding so-called interference from the vehicle 10 as shown in FIG. 5 when the airbag system is inflated and deployed. Therefore, even if the saddle-ride type vehicle 10 collides with the side of the running vehicle of the other party C and is turned in the traveling direction of the vehicle of the other party C as shown in FIG. 9, the airbag 30 is inflated and deployed in the substantially same direction as the traveling direction D before the collision and the state is easily maintained. That is, the airbag 30 is inflated and deployed immediately after the collision, the saddle-ride type vehicle 10 is ordinarily turned in the same direction as the vehicle of the other party C immediately after the inflation and deployment, and the rider M comes to collide with the side of the vehicle of the other party C in the traveling direction D before the collision, however, at that time, the neck part 30n having the neckings 30c can avoid interference from the vehicle 10 by a quantity in which the neckings 30c are provided. For example, even if the saddle-ride type vehicle 10 is laterally moved in FIG. 5, the vehicle body (the handlebar 14 in FIG. 5) not significantly abuts on the neck part 30n because of the existence of the neckings 30c. As a result, the airbag 30 is not significantly moved together with the vehicle 10.

Therefore, as shown in FIG. 9, a position of the head part 30h in the inflated and deployed airbag 30 is easily matched with the moving direction D of the rider M according to the law of inertia.

According to the airbag system 20 in this embodiment, as shown in FIG. 5, as the airbag 30 is provided with the head part 30h which is opposite to the head Mh of the rider M when the airbag is inflated and deployed and the neck part 30n which rises upward from the vehicle 10 and toward the part opposite to the head 30h, the width W1 in the direction of vehicle width, which is narrower than the width of the head part 30h, and which has the neckings 30c curved inside in the direction of vehicle width, the neck part 30n and the part opposite to the head 30h are inflated and deployed with the neck part 30n having the neckings 30c avoiding so-called interference from the vehicle 10 as shown in FIG. 5 when the airbag system is inflated and deployed. Therefore, even if the saddle-ride type vehicle 10 collides with the side of the running vehicle of the other party C and is turned in the traveling direction of the vehicle of the other party C as shown in FIG. 9, the airbag 30 is inflated and deployed in the substantially same direction as the traveling direction D before the collision and the state is easily maintained. That is, the airbag 30 is inflated and deployed immediately after the collision, the saddle-ride type vehicle 10 is ordinarily turned in the same direction as the vehicle of the other party C immediately after the inflation and deployment, and the rider M comes to collide with the side of the vehicle of the other party C in the traveling direction D before the collision, however, at that time, the neck part 30n having the neckings 30c can avoid interference from the vehicle 10 by a quantity in which the neckings 30c are provided. For example, even if the saddle-ride type vehicle 10 is laterally moved in FIG. 5, the vehicle body (the handlebar 14 in FIG. 5) does not significantly abut the neck part 30n because of the existence of the neckings 30c. As a result, the airbag 30 is not significantly moved together with the vehicle 10.

As shown in FIGS. 4 and 5, the airbag 30 and the handlebar 14 are configured so that the head part 30h is located on the upside of the handlebar 14 provided to the vehicle because the neck part 30n rises when the airbag is inflated and deployed.

As a result, the airbag 30 can more securely avoid interference from the vehicle, particularly from the handlebar 14, and is not significantly moved together with the vehicle 10. Therefore, the position of the head part 30h is more easily matched with the moving direction D of the rider M.

As shown in FIG. 5, the head part 30h is configured so that an upper part 30h2 is wider than a lower part 30h1 when the airbag is inflated and deployed in the direction of vehicle width. The airbag 30 is so-called fan-shaped, including the neck part 30n.

As a result, the airbag 30 can more securely avoid interference from the vehicle 10 and is not significantly moved together with the vehicle 10. Therefore, the position of the head part 30h is more easily matched with the moving direction D of the rider M. The whole airbag 30 is compacted both by narrowing the width of the lower part 30h1 of the head part 30h, compared with the width of the upper part 30h2 and by providing the neckings 30c, and at the same time, a rider protecting function can be enhanced by relatively widening the width of the upper part 30h2 of the head part 30h.

As shown in FIG. 4, the part opposite to the head 30h is located in front of the handlebar 14 provided to the vehicle when the airbag is inflated and deployed.

As a result, the airbag 30 can more securely avoid interference from the vehicle, particularly from the handlebar 14, and is not significantly moved together with the vehicle. Therefore, the position of the head part 30h is more easily matched with the moving direction of the rider.

The airbag system 20 in this embodiment can be provided with an interlocking device 40 between the steering unit ST and the airbag 30. An example of a configuration of the interlocking device 40 will be described later, however, the interlocking device 40 is a device for determining a direction in which the airbag 30 is inflated and deployed according to a state of the steering unit ST during collision with the vehicle of the other party C (more precisely, immediately after collision), that is, when the airbag 30 is inflated and deployed.

When the airbag 30 is inflated and deployed, the interlocking device 40 can make airbag 30 inflate and deploying in a counterclockwise direction L; the inflating and deploying direction is shown by an arrow L1. FIG. 6(b) illustrates a view from the back of the vehicle 10 as shown by a full line in FIG. 6(b) if the steering unit ST directs the vehicle 10 clockwise in the top view, that is, the steering unit ST is turned clockwise R as shown by a full line in FIG. 6(a). If the steering unit ST directs the vehicle 10 counterclockwise L in the top view as shown by an imaginary line in FIG. 6(a) when the airbag 30 is inflated and deployed, that is, the steering unit ST is turned counterclockwise L, the interlocking device makes the airbag 30 inflate and deploy clockwise R in the view from the back of the vehicle (the inflating and deploying direction is shown by an arrow R1) as shown by an imaginary line in FIG. 6(b).

As a result, the following action and effect are acquired.

When the saddle-ride type vehicle 10 collides with the side of the running vehicle of the other party C as shown in FIG. 7, the front wheel 16F of the saddle-ride type vehicle 10 is ordinarily turned in a traveling direction F of the vehicle of the other party C, due to collision with the vehicle of the other party C, as shown in FIG. 8. Accordingly, the steering unit ST is also turned in the same direction (in a direction shown by an arrow R in a case shown in FIG. 8) (see FIG. 6(a)). The saddle-ride type vehicle 10 itself is also turned in the traveling direction of the vehicle of the other party (yawing is caused and the saddle-ride type vehicle is moved or re-directed by the vehicle of the other party C). That is, the saddle-ride type vehicle 10 is laterally moved in the traveling direction of the vehicle of the other party C apart from the traveling direction D before the collision due to collision with the vehicle of the other party C.

In the meantime, as described above, the rider M of the saddle-ride type vehicle 10 comes to collide with the side of the vehicle of the other party C in the traveling direction D before the collision (without being laterally moved), according to the law of inertia.

As described above, when the airbag 30 which is deployed between the vehicle of the other party C and the rider M and fulfills buffer action is used as in this embodiment, consideration of yawing is required because the timing of the action on the rider M of the airbag 30 is slower, compared with the in-one's own vehicle supporting airbag.

In the meantime, according to the airbag system 20 in this embodiment, as shown in FIG. 6, if the steering unit ST of the saddle-ride type vehicle 10 directs the vehicle 10 clockwise R in the top view immediately after collision, that is, when the airbag 30 is inflated and deployed, the airbag 30 is directed counterclockwise L in a view from the back of the saddle-ride type vehicle 10 and is inflated and deployed upward (in the direction shown by the arrow L1) from the vehicle 10 by the operation of the interlocking device 40. The inflated and deployed position is matched with the moving direction D of the rider M according to the law of inertia (see FIG. 9).

FIGS. 8 and 9 show a state in which the vehicle of the other party C advances rightward in the top view, however, when the saddle-ride type vehicle collides with the vehicle of the other party C advancing leftward, the steering unit ST is turned leftward L. That is, as shown in FIG. 6, if the steering unit ST of the saddle-ride type vehicle 10 directs the vehicle 10 counterclockwise L in the top view when the airbag 30 is inflated and deployed immediately after collision, the airbag 30 is directed clockwise R in the view from the back of the saddle-ride type vehicle 10 by the operation of the interlocking device 40 and is inflated and deployed upward (in the direction shown by the arrow R1) from the vehicle 10. The inflated and deployed position is also matched with the moving direction of the rider according to the law of inertia.

Accordingly, according to this embodiment of the airbag system 20 of the saddle-ride type vehicle, even if the vehicle 10 collides with the side of the running vehicle of the other party C, the airbag 30 can fulfill its role. The airbag 30 satisfactorily fulfills its function due to the above-mentioned configuration (see FIGS. 4 and 5) of the airbag 30, and the above-mentioned function of the interlocking device 40.

FIGS. 8 and 9 show a state in which the traveling direction D of the saddle-ride type vehicle 10 is slightly inclined for the traveling direction F of the vehicle of the other party C. However, even if the traveling direction D of the saddle-ride type vehicle 10 is perpendicular to the traveling direction F of the vehicle of the other party C, the similar phenomenon occurs. Besides, when the traveling direction D of the saddle-ride type vehicle 10 is inclined for a collision surface of an object of collision even if the object of collision such as the vehicle of the other party C is stopped, the turning of the steering unit ST also occurs.

Accordingly, in such a case, according to the airbag system 20 of the saddle-ride type vehicle, the airbag 30 can also fulfill its role.

FIGS. 10(a)-10(c) illustrates an example of a main part of the airbag system 20. FIG. 10(a) is a plan, FIG. 10(b) is a side view of FIG. 10(a), and FIG. 10(c) is a front view (viewed from the back of the vehicle) of FIG. 10(a). FIG. 11 is a sectional view showing a state in which the airbag 30 and an inflator 32 are housed in a body of a retainer.

The airbag system 20 is provided with the airbag 30, the retainer 50 that houses the airbag 30, and the interlocking device 40.

The retainer 50 is provided with the box-type body 51, a supporting mechanism 52 that attaches the body 51 of the retainer to the vehicle 10, which is turnably clockwise R and counterclockwise L in the view from the back of the vehicle 10 as shown in FIG. 10(c) and a locking mechanism 53 that locks the turning of the body 51 of the retainer by the supporting mechanism 52.

The body 51 of the retainer includes a case provided with an opening 51a (see FIG. 11) for inflating and deploying the airbag on the upside, and an installation hole 51d for attaching the inflator 32 is provided to a bottom plate 51b. As shown in FIG. 11, the inflator 32 is fixed to the body 51 of the retainer by fixing its flange 32b with a keep plate 51c.

As shown in FIG. 11, the airbag 30 can be housed integrally with the inflator 32 in a state in which the airbag is folded in the body 51 of the retainer.

Figure 12:
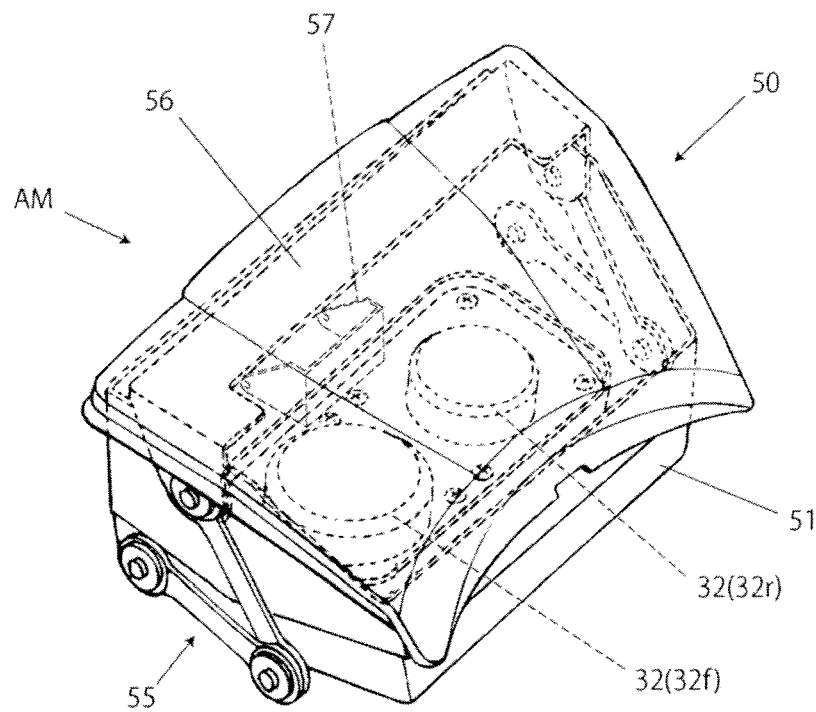
FIG. 12 is a perspective view showing one embodiment of an airbag module.

As shown in FIG. 1, in this embodiment, a shock sensor 51 is installed in the right and left front forks 13 and a control unit CU is mounted in front of the retainer 50. The shock sensor 51 is electrically connected to the control unit CU; and the control unit CU is electrically connected to the inflator 32. When a collision occurs, the shock sensor S1 transmits detected deceleration data to the control unit CU and the control unit CU instantaneously judges whether the airbag 30 should be operated or not based upon the deceleration data. When the control unit judges that the airbag should be operated, it feeds current for ignition to the inflator 32 so as to operate the inflator 32 and generate gas in the airbag 30 and inflates and deploys the airbag 30. The body 51 of the retainer can be configured as an airbag module AM provided with a lid 56 equipped with a link 55, as shown in FIGS. 12 and 13. When the airbag system 20 is not operated, the lid 56 is closed as shown in FIGS. 12 and 13($a$). However, when the airbag 30 is inflated by the operation of the inflator 32, the lid 56 is opened as shown in FIG. 13($b$) by the pressure and the airbag 30 is inflated and deployed forward and upward as shown by an arrow A. At that time, as an open angle θ1 of the lid 56 is defined by the extension of the link 55 as shown in FIG. 13($b$) and hereby, an inflation/deployment angle of the airbag 30 is defined. The inflated and deployed airbag 30 receives the rider M and can protect the rider M by effectively absorbing the kinetic energy of the rider, exhausting gas from an exhaust hole (see 30$v$ in FIG. 7) and deflating. The contours of the body 51 of the retainer shown in FIG. 10 and the contours of the body 51 of the retainer shown in FIGS. 12 and 13 are different. However, any contour can be adopted.

Figure 10:
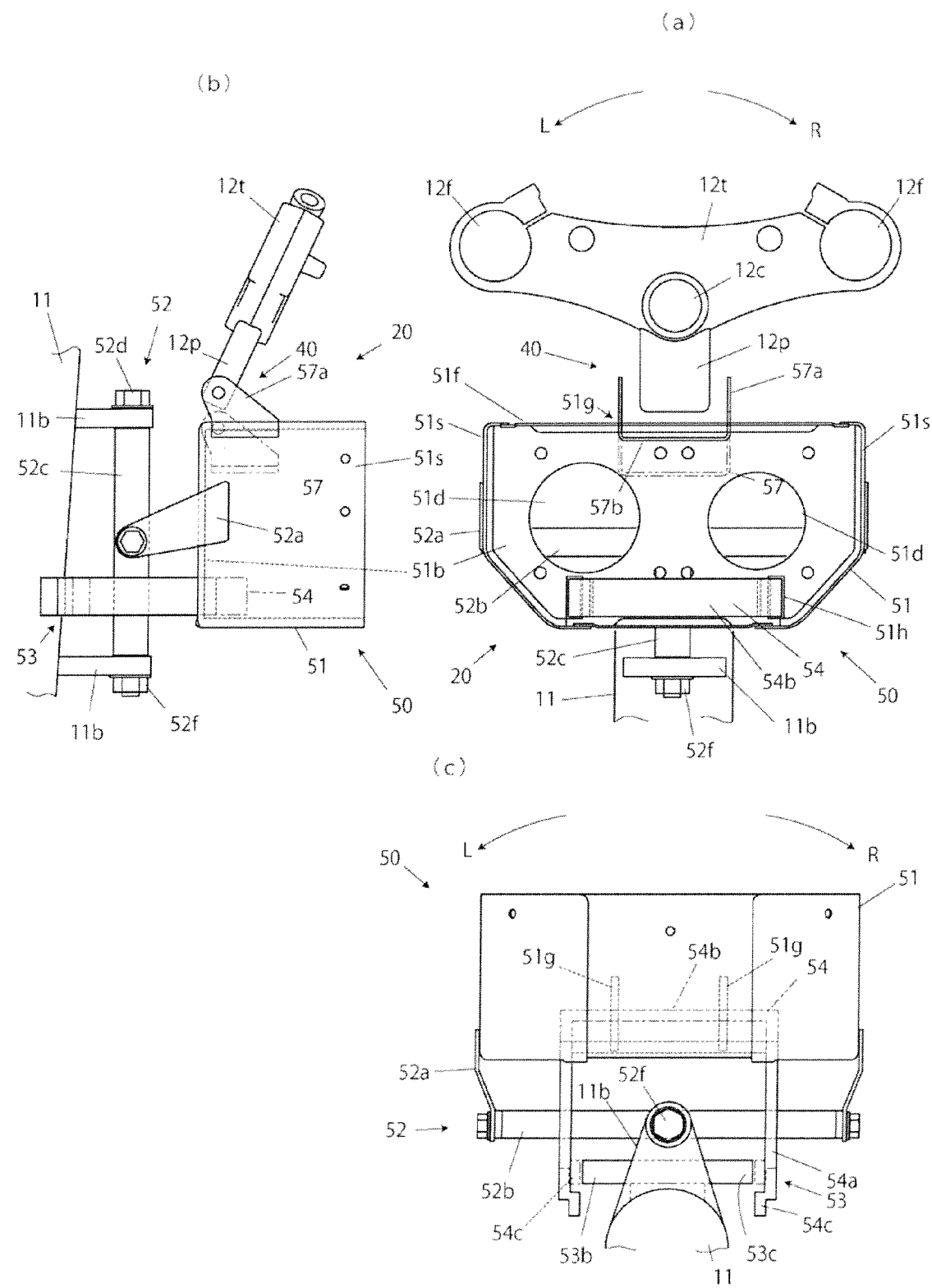
FIGS. 10(a)-10(c) show a main part of the airbag system.
Figure 11:
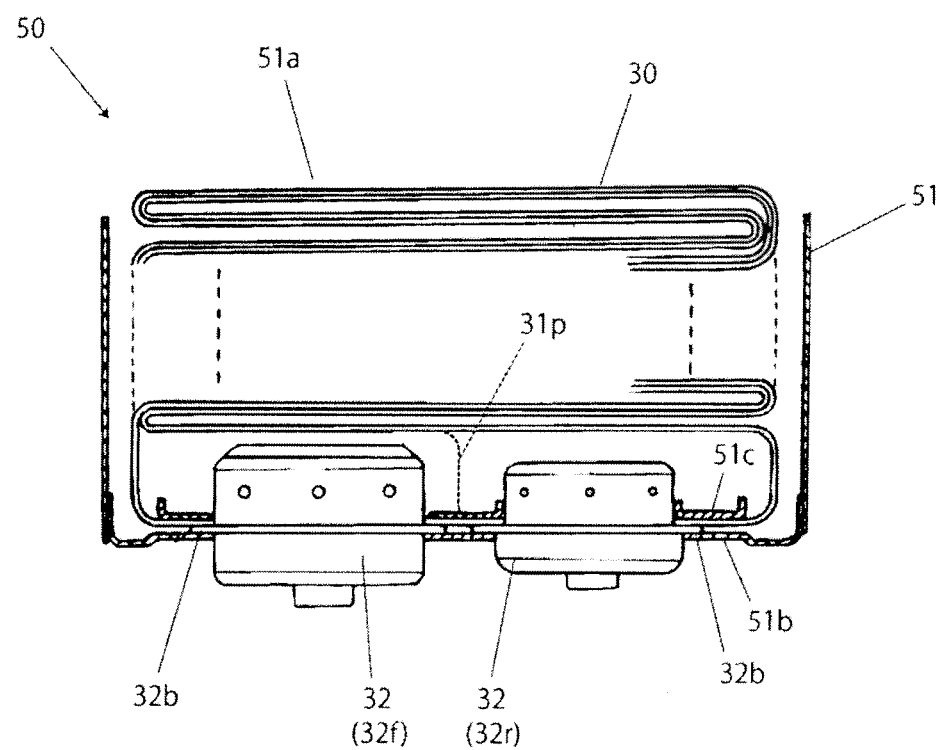
FIG. 11 is a sectional view showing a state in which the airbag 30 and an inflator 32 are housed in a body of a retainer.

As shown in FIGS. 10($a$)-10($c$), the supporting mechanism 52 of the body 51 of the retainer is provided with right and left arms 52$a$ integrally hanging from right and left side boards of the body 51 of the retainer, a rod 52$b$ that couples the right and left arms 52$a$, a pipe 52$c$ fixed integrally with the rod 52$b$ with the pipe perpendicular to the rod 52$b$, a pair of brackets 11$b$ provided to the body frame 11, and a bolt 52$d$ and a nut 52$f$ that rotatably support the pipe 52$c$ inside each bracket 11$b$. The bolt 52$d$ is inserted into the pipe 52$c$ and the nut 52$f$ is connected to its end. The pipe 52$c$ is extended in a longitudinal direction of the vehicle 10, can be turned around the bolt 52$d$, and the body 51 of the retainer, the arms 52$a$ and the rod 52$b$ are turned integrally with the pipe 52$c$. Accordingly, the body 51 of the retainer can be turned clockwise R and the counterclockwise L in the view from the back of the vehicle 10 in regard to the vehicle 10 as shown in FIG. 10($c$).

The locking mechanism 53 can be provided to regulate the turning of the body 51 of the retainer by the supporting mechanism 52 when the airbag system 20 is not operated.

The locking mechanism 53 is provided with a regulating body 53$b$ provided on the side of the body of the vehicle and a regulated body 54 provided on the side of the body 51 of the retainer.

The regulating body 53$b$ is configured by a regulating block fixed to the body frame 11 and its both ends 53$c$ configure a regulating part that can be touched to the regulated body 54.

In this embodiment, the regulated body 54 is configured by a U-shaped plate member in the view from the back as shown in FIG. 10($c$). The regulated body 54 is provided with a pair of arms 54$a$ hanging toward the regulating body 53$b$ and a base 54$b$ that couples upper parts of these arms 54$a$ in the body 51 of the retainer, and the arms 54$a$ are attached to the body 51 of the retainer protrusibly downward from the body 51 of the retainer by inserting the arms into a hole 51$h$ bored in the bottom plate 51$b$ of the body 51 of the retainer.

A known temporary fastening means (not shown), for preventing the protrusion of the regulated body 54 when the airbag system 20 is not operated, is provided between the body 51 of the retainer and the regulated body 54. Thereby, the regulated body 54 is temporarily held in a position in which an end 54$c$ of the arm 54$a$ of the regulated body 54 is opposite to a regulating part 53$c$ of the regulating body 53$b$ as shown by an imaginary line in FIGS. 10($a$)-10($c$) when the airbag system 20 is not operated. In this state, as the end 54$c$ of the arm 54$a$ of the regulated body 54 is touched to the regulating part 53$c$ of the regulating body 53$b$ even if the body 51 of the retainer tries to turn around the pipe 52$c$, the turning of the body 51 of the retainer is prevented.

In the meantime, when the airbag system 20 is operated, the inflator 32 is operated as described above and the airbag 30 is inflated and deployed upward (more precisely, upward and forward) from the opening 51$a$ of the body 51 of the retainer, however, force in a direction in which the regulated body 54 is protruded from the body 51 of the retainer acts on the regulated body 54 by the rise of pressure in the body 51 of the retainer and the inflating of the airbag 30 at this time. The temporary holding of the regulated body 54 by the temporarily fastening means is released by this force and the regulated body 54 is protruded as shown by each full line in FIG. 10. A state in which the end 54$c$ of the arm 54$a$ of the regulated body 54 and the regulating part 53$c$ of the regulating body 53$b$ are opposite is released by the protrusion, and the body 51 of the retainer can be turned around the pipe 52$c$.

As shown in FIGS. 10($a$)-10($c$), the interlocking device 40 can be provided with an operating part 12$p$ provided to the steering unit ST and an engaging part 57 which is provided to the retainer 50 and can be engaged with the operating part 12$p$.

The operating part 12$p$ is configured as a projecting portion provided to a top bridge 12$t$ forming a part of the steering unit ST. In FIG. 10($a$), a reference sign 12$f$ denotes a hole in which the front fork 13 is connected and 12$c$ denotes a hole in which the stem shaft 12$s$ is connected.

In this example, the engaging part 57 is configured by an engaging member made of a U-shaped plate in a view from the top as shown in FIG. 10($a$). The engaging member 57 is provided with a pair of arms 57$a$ extended toward the operating part 12$p$ and a base 57$b$ that couples bases of these arms 57$a$ in the body 51 of the retainer and is attached to the body 51 of the retainer protrusibly forward from the body 51 of the retainer by inserting the arms 57$a$ into each hole 51$g$ provided to a front plate 51$f$ of the body 51 of the retainer.

A known temporary fastening means (not shown), for preventing the protrusion of the engaging member 57 when the airbag system 20 is not operated, is provided between the body 51 of the retainer and the engaging member 57. Thereby, the engaging member 57 is temporarily held in a position in which the arm 57$a$ of the engaging member 57 is not fitted to the operating part 12$p$ as shown by imaginary lines in FIGS. 10($a$)-10($c$) when the airbag system 20 is not operated. In this state, as the arm 57$a$ of the engaging member 57 is not engaged with the operating part 12$p$ even if the steering unit ST is turned and the operating part 12$p$ is turned, the body 51 of the retainer is not turned.

When the airbag system 20 is operated, the inflator 32 is operated as described above and the airbag 30 is inflated and deployed upward from the opening 51$a$ of the body 51 of the retainer. However, force in a direction in which the engaging member is protruded from the body 51 of the retainer acts on the engaging member 57 by the rise of pressure in the body 51 of the retainer and the inflation of the airbag 30 at this time. The temporary holding of the engaging member 57 by the temporarily fastening means is released by this force and the engaging member 57 is protruded as shown by full lines in FIG. 10. The arm 57a of the engaging member 57 can be engaged with the operating part 12p by the protrusion and the body 51 of the retainer can be turned around the pipe 52c in interlock with the turning of the steering unit ST.

The interlocking device 40 directs the airbag 30 counterclockwise L as shown in FIG. 6(b) in the view from the back of the vehicle and inflates and deploys the airbag by turning the retainer (the body 51 in this case) counterclockwise L as shown in FIG. 10(c) in the view from the back of the vehicle if the steering unit ST directs the vehicle 10 clockwise R as shown in FIG. 6(a) and FIG. 10(a) in the top view when the airbag 30 is inflated and deployed. Besides, if the steering unit ST directs the vehicle 10 counterclockwise L as shown in FIGS. 6(a) and 10(a) in the top view when the airbag is inflated and deployed, the interlocking device directs the airbag 30 clockwise R as shown in FIG. 6(b) in the view from the back of the vehicle 10 by turning the body 51 of the retainer clockwise R as shown in FIG. 10(c) in the view from the back of the vehicle and inflates and deploys the airbag.

According to the above-mentioned interlocking device 40, a position in which the airbag 30 is inflated and deployed can be securely matched with the moving direction D of the rider M with simple configuration (see FIG. 9).

Besides, as the interlocking device 40 is configured by the operating part 12p provided to the steering unit ST and the engaging part 57 provided to the retainer 50 and engaged with the operating part 12p, the position in which the airbag 30 is inflated and deployed can be matched with the moving direction D of the rider M with simpler configuration.

Further, as the engaging part 57 has configuration that the engaging part is protruded toward the operating part 12p only when the airbag 30 is inflated and deployed and can be engaged with the operating part 12p, the steering unit ST and the retainer 50 of the airbag 30 are interlocked only in the case of need. Accordingly, an unnecessary motion of the retainer 50 can be prevented.

Furthermore, as the engaging part 57 has configuration that the engaging part is protruded toward the operating part 12p by internal pressure in the body 51 of the retainer raised when the airbag 30 is inflated and deployed and the inflation of the airbag 30, the engaging part 57 can be protruded utilizing the inflation and deployment of the airbag 30 as it is. Accordingly, means for protruding the engaging part 57 is not required to be separately prepared, and an increase of the number of parts can be avoided.

Furthermore, as the operating part 12p is configured as the projecting portion provided to the top bridge 12t forming a part of the steering unit ST, the projecting portion has only to be provided to the top bridge 12t and intricate working for the operating part is not required.

Figure 14:
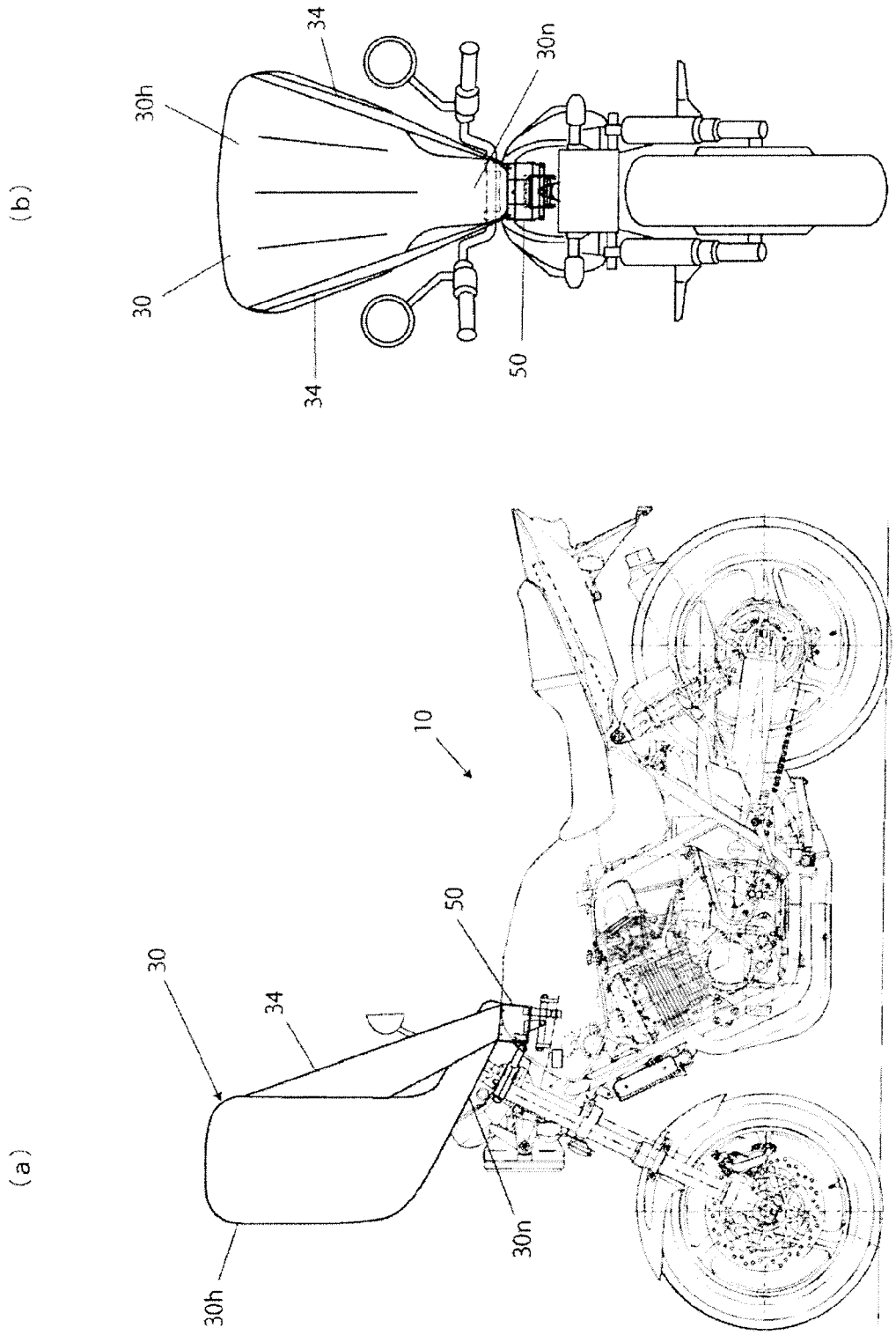
FIGS. 14(a)-14(b) show one embodiment of a saddle-ride type vehicle using another embodiment.

FIGS. 14(a)-14(b) show one embodiment of a saddle-ride type vehicle using another embodiment; FIG. 14(a) is a side view, and FIG. 14(b) shows the vehicle viewed from the back.

This embodiment is different from the above-mentioned embodiment in that a pair of right and left mooring bodies 34, that couple head part 30h and the vehicle 10 separately from a neck part 30n and moor the head part 30h in inflating and deploying, are provided and are similar at the other points.

As a result, even if no material body for supporting an airbag 30 (for example, no surface of a vehicle of the other party C) exists immediately in front of the airbag 30 inflated and deployed as shown in FIG. 15(a) for example, the airbag 30 receives rider M and can absorb a part of rider's kinetic energy. If the mooring body 34 is not provided, the airbag 30 cannot receive the rider M when no material body for supporting the airbag 30 (for example, no surface of the vehicle of the other party C) exists immediately in front of the airbag 30 inflated and deployed, for example, as shown in FIG. 15(b).

In the meantime, the airbag 30 receives the rider M as shown in FIG. 15(a) for example by providing the mooring body 34 and can absorb a part of the rider's kinetic energy.

The mooring body 34 is coupled to the above-mentioned airbag module AM on the side of the vehicle. For example, the mooring body can be directly fixed to an inner face of a side board 51s of the body 51 of the retainer shown in FIG. 10 for example. The mooring body 34 can be housed together with the airbag 30 with the mooring body folded in the body 51 of the retainer.

When the mooring body 34 is coupled not to a body of the vehicle 10 (for example, a body frame 11) but to the airbag module AM, a degree of freedom in the design of the other body parts, for example, the body frame 11 is enhanced, compared with a case that the mooring body 34 is coupled to the body of the vehicle 10.

The pair of right and left mooring bodies 34 are coupled to both right and left ends of the head part 30h in a direction of vehicle width on the side of the airbag 30.

As a result, even if no material body for supporting the airbag 30 (for example, no surface of the vehicle of the other party C) exists immediately in front of the airbag 30 inflated and deployed, the airbag 30 can receive the rider M and can absorb a part of rider's kinetic energy.

Figure 16:
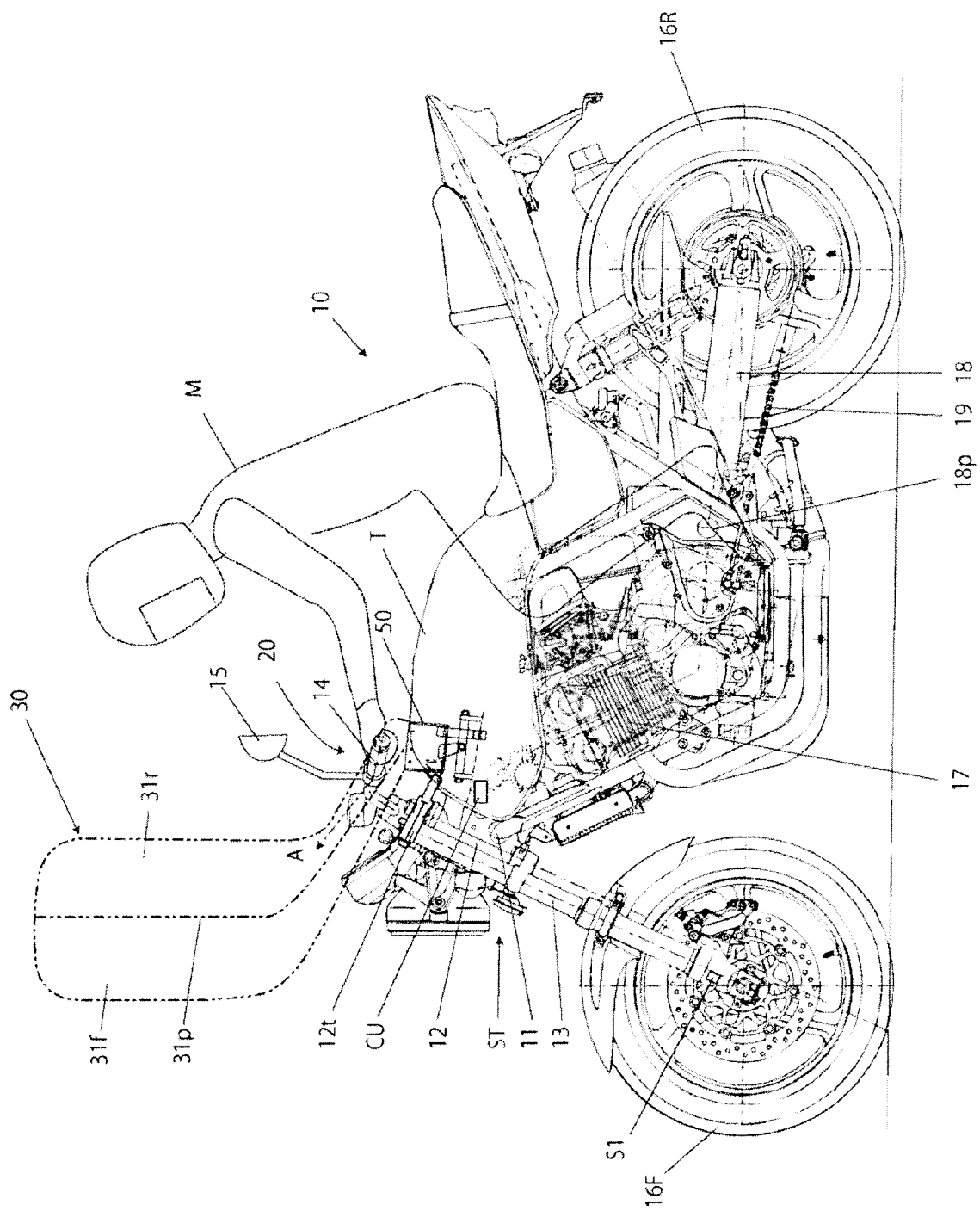
FIG. 16 is a side view showing one embodiment of a saddle-ride type vehicle using further another embodiment.

FIG. 16 is a side view showing one embodiment of a saddle-ride type vehicle using a further embodiment.

This embodiment is different from the above-mentioned embodiments in that the inside of an airbag 30 can be divided into plural expansion chambers 31f, 31r different in internal pressure in inflating and deploying in a longitudinal direction of a vehicle 10, and is similar at the other points. A reference numeral 31p denotes a partition that divides or partitions the inside of the airbag 30 into the front and rear expansion chambers 31f, 31r. The airbag 30 shown in FIG. 16 is divided in two in the longitudinal direction; however, the airbag can be also divided in three or more sections or chambers.

Figure 17:
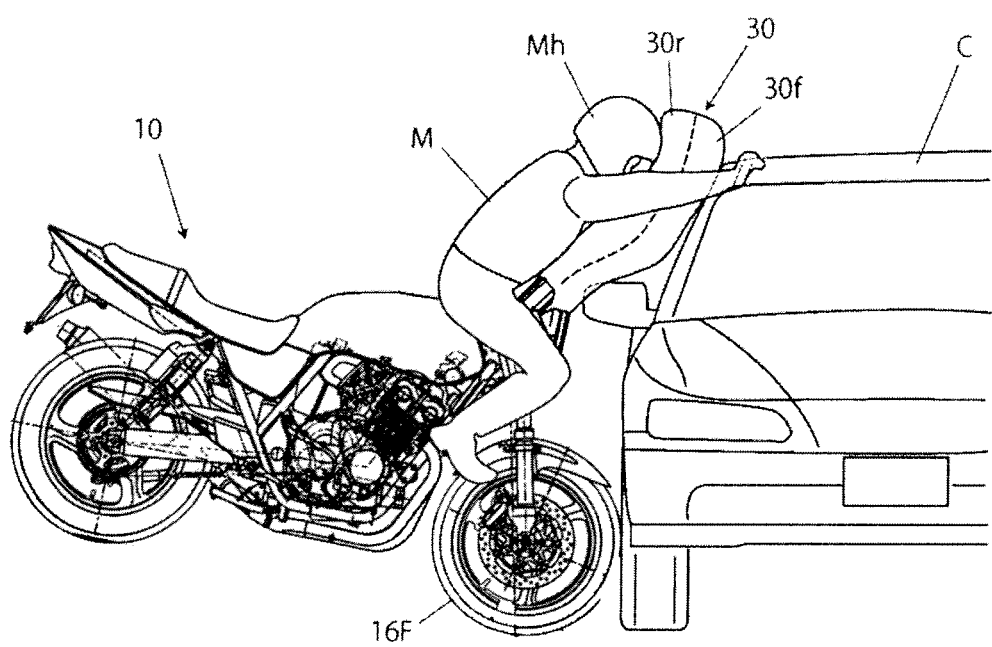
FIG. 17 is an explanatory drawing for explaining action.

As a result, as the inside of the airbag 30 is divided into the plural expansion chambers 31f, 31r in the longitudinal direction of the vehicle 10 and internal pressure in the expansion chambers 31f, 31r in inflating and deploying is different, the expansion chamber the internal pressure of which is higher (for example, 31f) is made to function as an expansion chamber having enough hardness to support the airbag 30 in contact with an object of collision (for example, a vehicle of the other party C) and at the same time, the expansion chamber having lower internal pressure (for example, 31r) can be made to function as an expansion chamber having enough softness to acquire buffer action in contact with an rider M as shown in FIG. 17 for example.

That is, according to the airbag 30 in this embodiment, sufficient hardness and softness to act as a buffer between the object of collision C and the rider M can be acquired.

As for the internal pressure of the plural expansion chambers 31f, 31r, the internal pressure of the rearmost expansion chamber 31r is made lower, compared with the internal pressure of the front expansion chamber 31f.

As a result, the front expansion chamber 31f touched to the object of collision C can be configured as an expansion chamber having hardness and shape holding capability suitable for touching to the object of collision C by relatively hardening the front expansion chamber, compared with the rearmost expansion chamber 31r touched to the rider M, and at the same time, the rearmost expansion chamber 31r touched to the rider M can be configured as an expansion chamber having softness suitable for touching to the rider M by relatively softening the rearmost expansion chamber, compared with the front expansion chamber 31f touched to the object of collision C.

Figure 18:
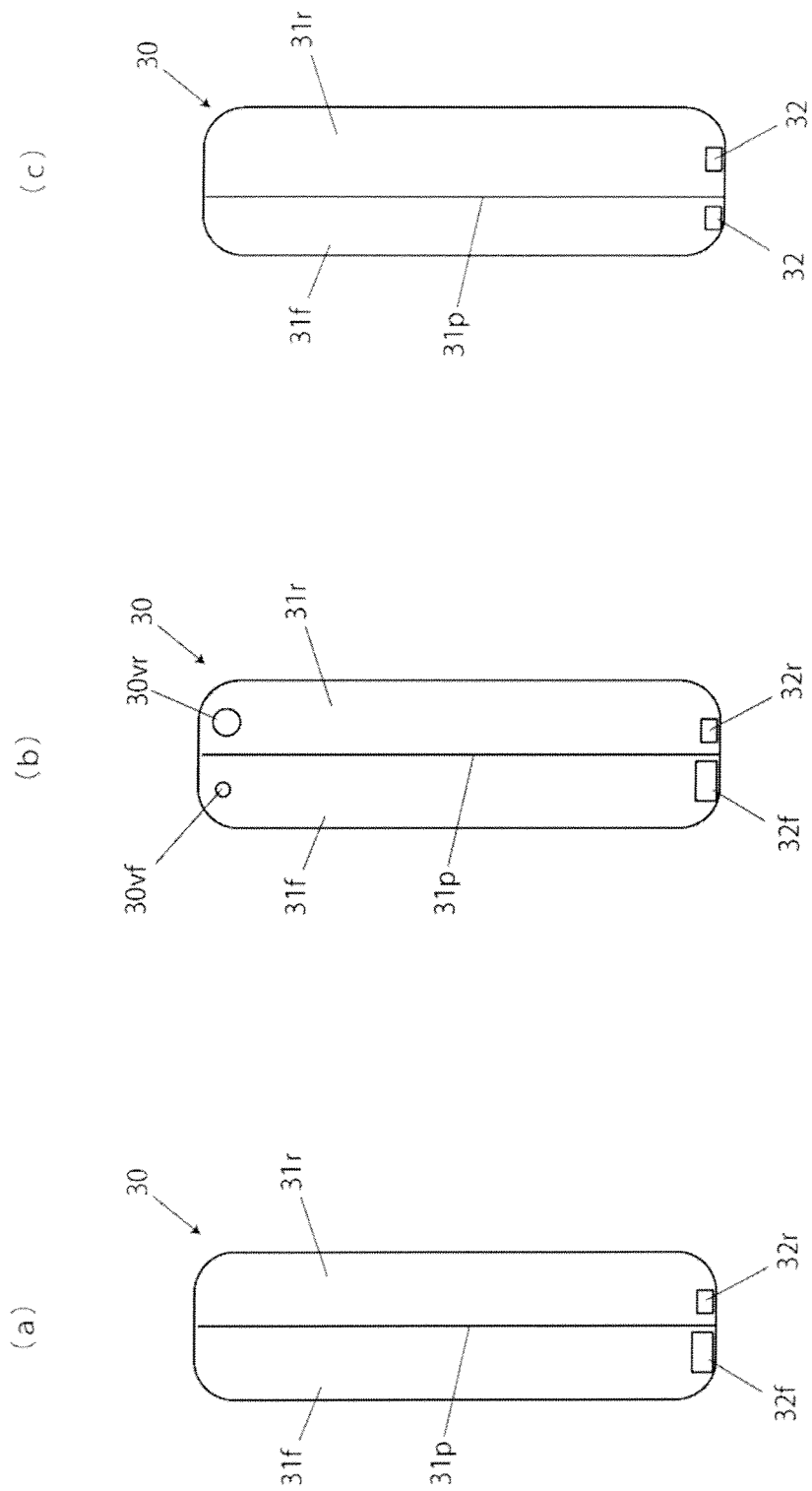
FIGS. 18(a) to 18(c) are explanatory drawings showing means for differentiating the internal pressure of plural expansion chambers 31f, 31r.

FIGS. 18(a) to 18(c) are explanatory drawings showing devices for differentiating the internal pressure of the plural expansion chambers 31f, 31r.

Each internal pressure of the plural expansion chambers 31f, 31r can be differentiated by providing inflators 32f, 32r different in output to the expansion chambers 31f, 31r and inflating and deploying the plural expansion chambers 31f, 31r by the respective inflators 32f, 32r as shown in FIG. 18(a). In this case, the internal pressure of the rearmost expansion chamber 31r can be reduced, compared with the internal pressure of the front expansion chamber 31f by reducing the output of the inflator 32r for inflating the rearmost expansion chamber 31r, compared with the output of the inflator 32f for inflating the front expansion chamber 31f.

As a result, the internal pressure of the expansion chambers 31f, 31r can be differentiated with simple configuration that the inflators 32f, 32r different in output are provided to the plural expansion chambers 31f, 31r.

The inflators 32f, 32r different in output can be also arranged in a direction of vehicle width as shown in FIG. 11 and in that case, the partition 31p is arranged in a state in which the partition is shifted by 90 degrees for example in the body 51 of the retainer as shown by a broken line in FIG. 11.

Besides, the internal pressure of the plural expansion chambers 31f, 31r can be differentiated by providing vent holes 30vf, 30vr different in the area of an opening to the plural expansion chambers 31f, 31r as shown in FIG. 18(b) and differentiating the relieved quantity of gas from the plural expansion chambers 31f, 31r in inflating and deploying. In this case, the internal pressure of the rearmost expansion chamber 31r can be reduced, compared with the internal pressure of the front expansion chamber 31f by increasing the area of the opening of the vent hole 30vr provided to the rearmost expansion chamber 31r, compared with the area of the opening of the vent hole 30vf provided to the front expansion chamber 31f.

As a result, the internal pressure of the expansion chambers 31f, 31r can be differentiated with simple configuration that the vent holes 30vf, 30vr different in the area of the opening are provided to the plural expansion chambers 31f, 31r. In this case, the output of the inflators for inflating the plural expansion chambers 31f, 31r can be also made similar, and as shown in FIG. 18(b), the output of the inflator 32r for inflating the rearmost expansion chamber 31r can be also reduced, compared with the output of the inflator 32f for inflating the front expansion chamber 31f.

The internal pressure of the plural expansion chambers 31f, 31r can be differentiated by differentiating the volume of the plural expansion chambers 31f, 31r as shown in FIG. 18(c), and providing the inflators 32 having the same output to each expansion chamber 31f, 31r. In this case, the internal pressure of the rearmost expansion chamber 31r can be reduced, compared with the internal pressure of the front expansion chamber 31f by increasing the volume of the rearmost expansion chamber 31r, compared with the volume of the front expansion chamber 31f.

As a result, the internal pressure of the expansion chambers 31f, 31r can be differentiated without preparing inflators having different output.

FIG. 19(a) is a side view showing one embodiment of a saddle-ride type vehicle using another embodiment; FIG. 19(b) is a sectional view viewed along a line b-b in FIG. 19(a).

This embodiment is different from the above-mentioned embodiments in that a protective sheet 35 for protecting a surface 30s is provided to an airbag 30 with the protective sheet loosened, compared with the surface 30s of the airbag 30.

As a result, as the protective sheet 35 for protecting the surface 30s of the airbag 30 is provided with the protective sheet loosened, compared with the surface 30s of the airbag 30, no tension is caused on the protective sheet 35 when the airbag 30 is inflated and deployed. Even if some tension is caused, it is minimal.

Accordingly, even if a sharp body hits on the protective sheet 35, the protective sheet 35 is not significantly damaged. When the sharp body (not shown) hits on the airbag 30, it hits via the protective sheet 35 and as the protective sheet 35 is not significantly damaged, external force applied to the airbag 30 by the sharp body acts on the airbag with the external force buffered by the protective sheet 35. Accordingly, the airbag 30 is also not significantly damaged.

Accordingly, even if the airbag 30 is pressed on the side and other parts of a vehicle of the other party C in collision with the vehicle of the other party C as shown in FIG. 7, the airbag 30 is not significantly damaged, and a function of the airbag for protecting rider M is secured.

As clear from the above-mentioned description, according to this embodiment, the airbag can be effectively protected without using a very strong sheet, compared with a case that the protective sheet is closely provided to the surface of the airbag 30.

Accordingly, according to this embodiment, as the airbag can be protected without requiring a thick sheet and/or a firm stitch, a small and compact airbag system suitable for the saddle-ride type vehicle 10 can be provided.

If only the protective sheet 35 is a sheet having strength at which the above-mentioned protecting function can be fulfilled, a sheet made of arbitrary material can be adopted. For example, well-known foundation cloth forming the airbag 30 can be used for the protective sheet 35. However, if the protective sheet 35 having higher tolerance to cutting or damage is used, the airbag system can be lightened and miniaturized.

As for means for providing the protective sheet 35 to the surface 30s of the airbag 30. The protective sheet 35 has only to be able to be provided with the protective sheet loosened and suitable means for providers the protective sheet to surface 30s of airbag 30 can be adopted.

Figure 19:
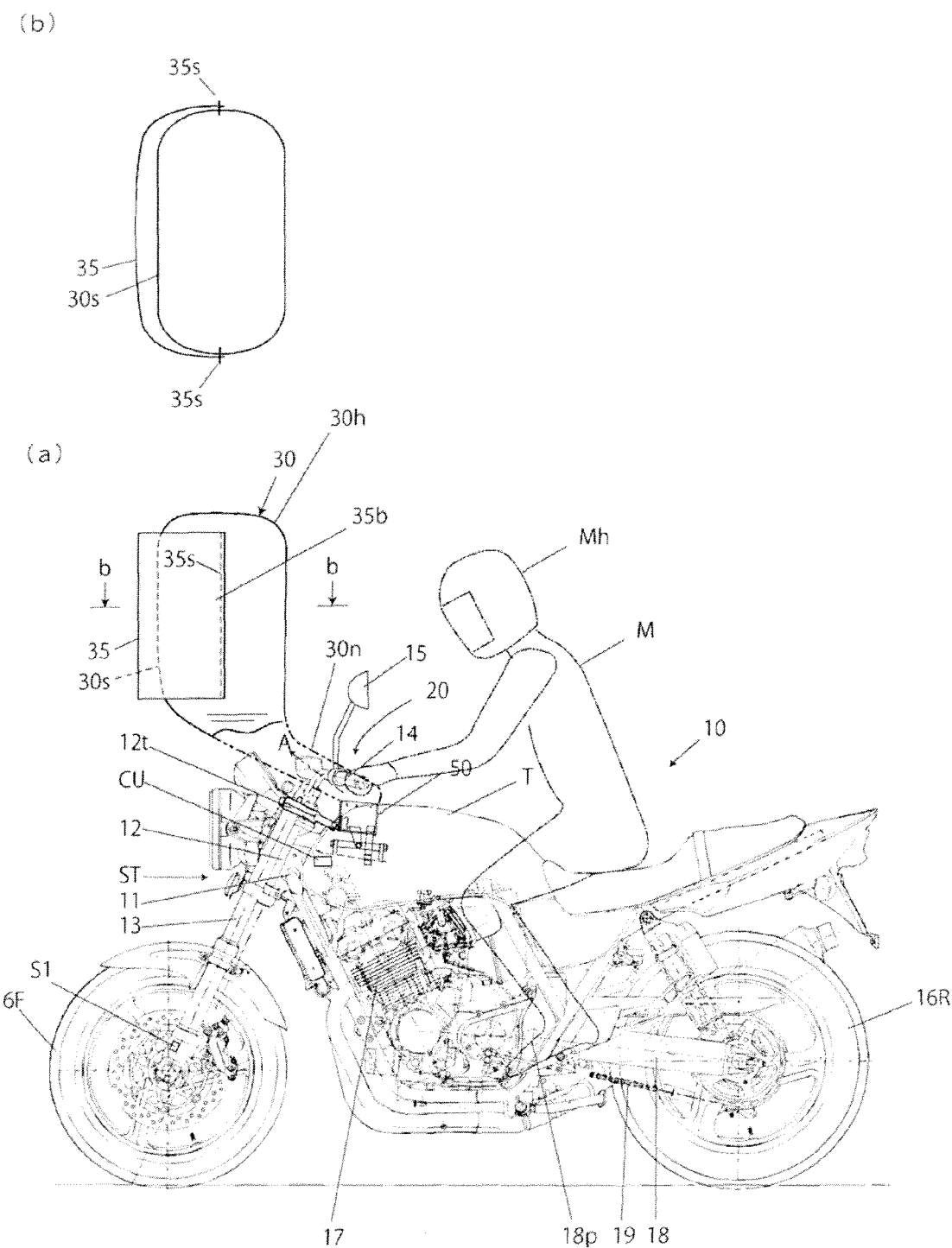
FIG. 19(a) is a side view showing one embodiment of a saddle-ride type vehicle using furthermore another embodiment and FIG. 19(b) is a sectional view viewed along a line b-b in FIG. 19(a).

As shown for example in FIG. 19, both sides 35b of the protective sheet 35 can be joined to the airbag 30; a joined part is shown by a reference sign 35s.

As shown in FIGS. 20(a) and 20(b), an upper edge 35c and a lower edge 35d of the protective sheet 35 can be joined to the airbag 30.

Besides, as shown in FIGS. 20(c) and 20(d), the periphery of the protective sheet 35 can be also connected to the airbag 30 at points (at four corners in a case shown in FIGS. 20(c) and 20(d)) of the periphery of the protective sheet 35. A connected part is shown by a reference sign 35m. The connected part 35m can be also connected by joining and can be also connected by welding and adhesion.

When the periphery of the protective sheet 35 is connected to the airbag 30 at the points as described above, the bulk of the connected part is reduced and housing size can be minimized.

Welding and adhesion can be used in place of joining 35s.

Even if any of the above-mentioned connecting means is used, the protective sheet 35 is provided to the surface 30s of the airbag 30 with the protective sheet loosened by connecting the airbag 30 and the protective sheet 35 in connected parts so that the protective sheet 35 connected to the airbag in the connected parts is longer than the airbag, compared with the distance of the surface 30s of the airbag.

The protective sheet 35 can prevent the airbag 30 from being damaged or torn, minimizing the housing size of the airbag 30 and the protective sheet 35 by providing the protective sheet only on the front side of the inflated airbag 30 as shown in FIG. 19.

Various embodiments of the present invention have been described, however, the present invention is not limited to the above-mentioned embodiments and can be suitably embodied in a range of the essential points of the present invention. The above-mentioned embodiments may be also combined.

REFERENCE SIGNS LIST

10 Saddle-ride type vehicle
14 Handlebar
20 Airbag system
30 Air bag
30c Necking
30h Head Part
30n Neck part
34 Mooring body

We claim:

1. An airbag system of a saddle-ride vehicle, comprising:
an airbag which is configured to be inflated and deployed in front of a rider upward from the vehicle in event of a collision,
wherein the airbag comprises a head part configured to be disposed opposite to a rider's head in inflating and deploying, and a neck part which is configured to rise upward from the vehicle and toward the head part, said neck part being narrower than the head part upon inflation and deployment of the airbag, said neck part having a necking extending from the head part and curved inwardly to form the narrower neck part, and
wherein the necking is configured to rise above a handlebar of the saddle-ride vehicle when the airbag is inflated and deployed, in order to prevent the handlebar from abutting the narrower neck part such that the head part is allowed to move freely to match a movement direction of the rider when the airbag is inflated and deployed toward the rider in the event of collision; and
a right mooring body and a left mooring body, configured to couple the head part and the vehicle separately from the neck part, and configured to moor the head part during inflation and deployment of the airbag,
wherein the right mooring body is coupled at a right end of the head part of the airbag, and wherein the left mooring body is coupled at a left end of the head part of the airbag.

2. The airbag system according to claim 1, wherein an upper part of the head part is wider than a lower part, upon inflation and deployment of the airbag.

3. The airbag system according to claim 1, wherein the right and left mooring bodies are coupled to an airbag module mounted in the vehicle in a state in which the airbag and an inflator that inflates and deploys the airbag are integrally housed on both sides of the vehicle.

4. The airbag system according to claim 1, wherein the head part is configured to be located, upon inflation and deployment, on an upper side of the handlebar provided on the vehicle.

5. The airbag system according to claim 4, wherein the head part is configured such that, during inflation and deployment of the airbag, the head part is located in front of the handlebar provided on the vehicle.

6. An airbag system of a saddle-ride vehicle, said system comprising:
protecting means for protecting a rider of the vehicle; and
inflating and deploying means for inflating and deploying the protecting means in front of the rider, upward from the vehicle, in an event of collision,
wherein the protecting means comprises:
engaging means for engaging with a rider's head during inflation and deployment of the protecting means;
supporting means for supporting the engaging means during inflation and deployment of the protecting means; and
preventing means for preventing a handlebar of the saddle-ride vehicle from abutting the supporting means such that the engaging means is allowed to move freely to match a moving direction of the rider when the protecting means is inflated and deployed toward the rider in the event of collision; and
right coupling means and left coupling means for coupling the engaging means and the vehicle separately from the supporting means, said right and left coupling means mooring the engaging means during inflation and deployment of the protecting means,
wherein the right coupling means is coupled at a right end of the head part of the airbag, and wherein the left coupling means is coupled at a left end of the head part of the airbag.

7. The airbag system according to claim 6, wherein an upper part of the engaging means is wider than a lower part of the engaging means, upon inflation and deployment of the protecting means.

8. The airbag system according to claim 6, wherein the right and left coupling means are coupled to an airbag module mounted on the vehicle, wherein the protecting means and the inflating and deploying means are integrally housed on both sides of the vehicle.

9. The airbag system according to claim 6, wherein the engaging means is located, upon inflation and deployment of the protecting means, on an upper side of the handlebar provided on the vehicle.

10. The airbag system according to claim 9, wherein the engaging means, upon inflation and deployment of the protecting means, is disposed in front of the handlebar provided on the vehicle.

* * * * *